(12) United States Patent
Nishiwaki et al.

(10) Patent No.: US 6,552,988 B1
(45) Date of Patent: Apr. 22, 2003

(54) APPARATUS FOR REPRODUCING INFORMATION RECORDED ON RECORDING MEDIUM WHILE ADJUSTING MIDDLE LEVEL OF DETECTED SIGNAL CORRESPONDING TO THE INFORMATION

(75) Inventors: Hiroshi Nishiwaki, Tsurugashima (JP); Hideki Hayashi, Tsurugashima (JP)

(73) Assignee: Pioneer Electric Corporation, Tokyo-To (JP)

( * ) Notice: Subject to any disclaimer, the term of this patent is extended or adjusted under 35 U.S.C. 154(b) by 0 days.

(21) Appl. No.: 09/258,150

(22) Filed: Feb. 26, 1999

(30) Foreign Application Priority Data

Feb. 27, 1998 (JP) .......................................... 10-047980

(51) Int. Cl.[7] .............................................. G11B 7/00
(52) U.S. Cl. ................................. 369/59.22; 369/53.33
(58) Field of Search ............................ 369/59.21, 59.22

(56) References Cited

U.S. PATENT DOCUMENTS

| | | | | | |
|---|---|---|---|---|---|
| 5,508,993 | A | * | 4/1996 | Hayashi et al. | 369/59.22 |
| 5,517,476 | A | * | 5/1996 | Hayashi | 369/59.22 |
| 5,566,155 | A | * | 10/1996 | Hayahsi | 369/59.22 |
| 5,606,540 | A | * | 2/1997 | Hayashi | 369/59.21 |
| 5,673,211 | A | * | 9/1997 | Hayashi et al. | 708/8 |
| 5,742,576 | A | * | 4/1998 | Hayashi et al. | 369/59.21 |
| 5,901,128 | A | * | 5/1999 | Hayashi et al. | 369/59.22 |
| 5,963,518 | A | * | 10/1999 | Kobayashi et al. | 369/59.22 |
| 6,111,846 | A | * | 8/2000 | Hayashi | 369/59.22 |
| 6,167,008 | A | * | 12/2000 | Kuribayashi | 369/44.32 |
| 6,304,538 | B1 | * | 10/2001 | Hayashi | 369/59.22 |

FOREIGN PATENT DOCUMENTS

| JP | 10106123 A | 4/1998 |
|---|---|---|
| JP | 10208250 A | 7/1998 |

OTHER PUBLICATIONS

Nakane et al.; *Access Method for Single–Spiral Land/Groove Recording Disc*, Technical Report of IEICE by the Institute of Electronics Information and Communication Engineers, pp. 29–34, Feb., 1996 (Translated Abstract).

* cited by examiner

*Primary Examiner*—Aristotelis M. Psitos
(74) *Attorney, Agent, or Firm*—Nixon & Vanderhye P.C.

(57) ABSTRACT

An information reproducing apparatus includes: a light emitting device that emits a light beam to the recording medium; a detecting device that detects the light beam reflected by the recording medium, and that generates a detection signal including a first component and a second component which have different middle levels; a sampling device that samples the first component and the second component included in the generated detection signal; an extraction device that extracts a first sampling value closest to the middle level of the first component from the first component, and that extracts a second sampling value closest to the middle level of the second component from the second component; a signal generation device that generates a first middle level signal by using the extracted first sampling value, and that generates a second middle level signal by using the extracted second sampling value; a compensation device that shifts the first component and the second component such that both the first middle level signal and the second middle level signal are matched to a predetermined level; and a decoding device that decodes the compensated first component and the compensated second component to reproduce the information.

12 Claims, 14 Drawing Sheets

APPARATUS FOR REPRODUCING INFORMATION RECORDED ON RECORDING MEDIUM WHILE ADJUSTING MIDDLE LEVEL OF DETECTED SIGNAL CORRESPONDING TO THE INFORMATION

BACKGROUND OF THE INVENTION

1. Field of the Invention

The present invention relates to an information reproducing apparatus for reproducing digital information recorded on a DVD-RAM (DVD random Access Memory) by a single spiral land/groove recording method.

2. Description of the Related Art

A DVD-RAM is a recording medium whose storage capacity is about four times as large as that of a CD (Compact Disk), and it is a recordable recording medium which enables a user to rewrite information thereon several times.

FIG. 1 shows the recording surface of the DVD-RAM 1. As shown in FIG. 1, a land track 1L and a groove track 1G are formed in a spiral form on the recording surface of the DVD-RAM 1. The land track 1L and the groove track 1G are alternately arranged in the radial direction of the DVD-RAM 1.

Digital information is recorded on such a recording surface according to a predetermined recording format based on a DVD standard. A "single spiral-land/groove (SS-L/G) recording method" is standardized as one recording format of the DVD-RAM in the DVD standard. This method is described in a paper: "Accessing method for single spiral-land groove recording" by Nakane et al., published in Technical Report of IEICE (the Institute of Electronics, Information and Communication Engineers), MR95-88, PCM95-126 (February 1996).

The single spiral land/groove recording method is adopted as the recording format of the DVD-RAM 1 shown in FIG. 1. In the single spiral-land/groove recording method, the digital information is recorded on both of the land track 1L and groove track 1G.

The digital information to be recorded on the DVD-RAM 1 is divided into sectors. The amount of the divided digital information contained in each sector is predetermined. Each of the land track 1L and groove track 1G are also divided into sectors corresponding to the sectors of the digital information, as shown in FIG. 1.

Control information recording areas S0–S7 are formed at the respective boundaries between neighboring sectors, as shown in FIG. 1. Hereinafter, the control information recording area is referred to as a "CIR area". The CIR areas S0–S7 are located at equiangular intervals in the direction of the rotation of the DVD-RAM 1.

At the CIR area S0, the arrangement of the land track 1L and groove track 1G are switched over to each other in the radial direction of the DVD-RAM 1. Namely, at the CIR area S0, the land track 1L is switched over to the groove track 1G, and the groove track 1G is switched over to the land track 1L. In other words, the land track 1L and the groove track 1G are substantially connected with each other through the CIR area S0. This structure enables the digital information to be continuously recorded onto or reproduced from both of the land track 1L and groove track 1G. In addition, at other CIR areas S1–S7, the land track 1L and groove track 1G are not switched over.

Control information is pre-recorded in each of the CIR areas S0–S7. The control information includes address information to substantially identify positions on the recording surface of the DVD-RAM 1. This information is needed for a recording process or a reproduction process of the digital information. For example, the control information includes information representing a physical position or a sector number to identify the sector located immediately after or before the CIR area.

FIG. 2 is enlarged view of a part of the recording surface of the DVD-RAM 1, which includes the CIR areas S0 and S1, and which is indicated by a broken line DL1 in FIG. 1. As shown in FIG. 2, the CIR area S0 is divided into two equal areas in the circumferential direction D1 of the DVD-RAM 1, which is shown by an arrow in FIG. 2. Each of the two equal areas is further divided into pre-recorded parts 70 and blank parts 71 in the radial direction D2 of the DVD-RAM 1, which is shown by another arrow in FIG. 2. Each of the pre-recorded parts 70 and the blank parts 71 is equal to the groove track 1G or the land track 1L in width (length in the radial direction D2). The pre-recorded parts 70 and the blank parts 71 are alternately located in each of the two equal areas in the radius direction D2. Each pre-recorded part 70 on the right side of the CIR area S0 is located ½ width out of the location of the groove track 1G in the radial direction D2. In contrast, each pre-recorded part 70 on the left side of the CIR area S0 is located ½ width out of the location of the groove track 1G in the radial direction D3 (opposite to the radial direction D2).

Control information is pre-recorded in each pre-recorded part 70 as pits P. In contrast, there is no pit on each blank part 71, so that the surface of each blank part 71 is like a mirror. This means that no information is recorded on each blank part 71. Each blank part 71 is equal to the land track 1L in height. The structure of each of the other CIR areas S1–S7 is the same as that of the CIR area S0.

When the digital information and the control information are read out from the DVD-RAM 1, a light beam is emitted from an optical pickup to the recording surface of the DVD-RAM 1. At this time, a light spot LS is formed by the light beam. The light spot LS is moved on the land track 1L and the groove track 1G alternately by the revolution of the DVD-RAM 1 and the movement of the pickup in the radial direction of the DVD-RAM 1. For example, the light spot LS is first moved on the groove track 1G. After the light spot has passed the CIR area S0, the light spot LS is next moved on the land track 1L. After the light spot LS has passed the CIR area S0 again, the light spot LS is next moved on the groove track 1G. In such a manner, the light spot LS is alternately moved on the groove track 1G and the land track 1L.

As shown in FIG. 2, the light spot LS is passed on an imaginary track T1 in the CIR area S0, when the light spot LS is moved from the groove track 1G to the land track 1L through the CIR area S0. When the light spot LS is passed on the imaginary track T1, the light spot LS is first passed on the pre-recorded part 70 located ½ width out of the location of the groove track 1G in the direction D3, and the light spot LS is next passed on the neighbor pre-recorded part 70 located ½ width out of the location of the groove track 1G in the opposite direction D2.

The light spot is passed on an imaginary track T2 in the CIR area S0, when the light spot LS is moved from the land track 1L to the groove track 1G through the CIR area S0. When the light spot LS is passed on the imaginary track T2, the light spot LS is first passed on the pre-recorded part 70 located ½ width out of the location of the land track 1L in the direction D2, and the light spot LS is next passed on the neighbor pre-recorded part 70 located ½ width out of the location of the land track 1L in the opposite direction D3.

The light spot is passed on an imaginary track T3 in the CIR area S1 (S2–S7), when the light spot LS is moved from a certain sector to the neighboring sector on the same groove track 1G. When the light spot LS is passed on the imaginary track T3, the light spot LS is first passed on the pre-recorded part 70 located ½ width out of the location of the groove track 1G in the direction D2, and the light spot LS is next passed on the neighbor pre-recorded part 70 located ½ width out of the location of the groove track 1G in the opposite direction D3.

The light spot is passed on an imaginary track T4 in the CIR area S1 (S2–S7), when the light spot LS is moved from a certain sector to the neighboring sector on the same land track 1L. When the light spot LS is passed on the imaginary track T4, the light spot LS is first passed on the pre-recorded part 70 located ½ width out of the location of the land track 1L in the direction D3, and the light spot LS is next passed on the neighbor pre-recorded part 70 located ½ width out of the location of the land track 1L in the opposite direction D2.

Now, it should be noted that the positional relationship between the two pre-recorded parts 70 adjacent to each other in the circumferential direction D1 is different between the imaginary tracks T1 and T3. On the basis of this difference, the change from the groove track 1G to the land track 1L can be detected. Similarly, the positional relationship between the two pre-recorded parts 70 is different between the imaginary tracks T2 and T4. On the basis of this difference, the change from the land track 1L to the groove track 1G can be detected.

FIG. 3 is a schematic view for showing the pickup 102 for reading the digital information and the control information from the recording surface of the DVD-RAM 1. The pickup 102 has an emitting device (not shown) for emitting the light beam to the recording surface of the DVD-RAM 1, and a detector (not shown) for receiving the light beam reflected by the recording surface. The detector has detecting surface 102A divided into two detection portions DP1 and DP2 by the tangential line of the groove track 1G (land track 1L). Namely, one detection portion DP1 is positioned above the outer circumferential side of the groove track 1G (land track 1L), and the other detection portion DP2 is positioned above the inner circumferential side of the groove track 1G (land track 1L).

The light beam reflected by the recording surface is received by the detection portions DP1 and DP2. The light beam received by the detection portion DP1 is converted to an electric signal. Also, the light beam received by the detection portion DP2 is converted to another electric signal. To obtain the digital information from the received light beam, a sum signal is generated by adding the two electric signals. To obtain the control information, a difference signal is generated by subtracting one electric signal from the other electric signal. The difference signal includes information indicating whether the location of the pre-recorded part 70 is off the location of the groove track 1G (land track 1L) in the radial direction D2 or D3. Therefore, the fact that the groove track 1G is switched over to the land track 1L or the fact that the land track 1L is switched over to the groove track 1G can be recognized on the basis of the difference signal.

FIG. 4 shows the sum signal Spp1 and the difference signal Spp2. In FIG. 4, the sum signal Spp1 has a relatively high frequency component. This component is a signal component necessary for reproduction, and contains the digital information. The amplitude of the sum signal Spp1 suddenly increases at time t1 and suddenly decreases at time t3, as a whole. Such sudden increase and decrease frequently occur whenever the light spot passes any of the CIR areas S0–S7. More specifically, the digital information is read out from the groove track 1G or the land track 1L during the time period t3–t4. During this time period, the middle level of the amplitude of the signal component of the sum signal Spp1 is L1. The control information is read out from any of the CIR areas S0–S7 during the time period t1–t3. During this time period, the middle level of the amplitude of the signal component of the sum signal Spp1 is L2. Thus, the middle level of the amplitude of the signal component of the sum signals Spp1 is varied depending on the reading position.

As for the difference signal Spp2, as shown in FIG. 4, the amplitude suddenly increases at time t1, and suddenly decreases at time t2, and the suddenly increases at time t3, as a whole. Such increases and decreases indicate whether the track on which the light spot is tracking is switched over from the groove track 1G to the land track 1L or from the land track 1L to the groove track 1G. Referring back to FIG. 2, when the light spot LS is passed on the imaginary track T2 in the CIR area S0, the light spot LS is passed firstly on the pre-recorded part 70 on the left side of the CIR area S0, and secondly on the pre-recorded part 70 on the right side of the CIR area S0. Therefore, as shown in FIG. 4, the amplitude of the difference signal Spp2 firstly increases and secondly decreases. On the other hand, when the light spot is passed on the imaginary track T1 in the CIR area S0, the amplitude of the difference signal Spp2 firstly decreases and secondly increases. By detecting such changes of the amplitude of the difference signal Spp2, the change from the groove track 1G to the land track 1L or the change from the land track 1L to the groove track 1G can be recognized. Furthermore, the difference signal Spp2 contains the relatively high frequency component during the time period t1–t3. This component is another signal component necessary for reproduction, and contains the control information. The middle level of the amplitude of the signal component of the difference signal Spp2 during the time period t1–t2 is L3. The middle level of the amplitude of the signal component of the difference signal Spp2 during the time period t2–t3 is L4.

In order to achieve reproduction of the digital information recorded on the DVD-RAM 1, it is needed to extract the digital information and the control information from the sum signal Spp1 and the difference signal Spp2, and to convert this information into binary data, respectively. However, the amplitude of each of the sum signal Spp1 and difference signal Spp2 is suddenly and frequently varied. Because of this, the middle level of the amplitude of the signal component including the digital information is different from that including the control information. In addition to this, the middle level of the amplitude of the signal component including the control information is suddenly varied at the time t2. These complications make it difficult to accurately extract the digital information and the control information and to accurately convert them into binary data. Therefore, there is a problem that it is difficult to enhance accuracy of the reproduction of the digital information from the DVD-RAM 1 using the single spiral land/groove recording method.

Meanwhile, there is another problem concerning to the extraction of the digital information from the sum signal Spp1. The sum signal Spp1 often contains noise components. The noise components are caused by disturbance, such as variations of reflectance of the DVD-RAM, variations of refraction factor of the DVD-RAM, an error of the servo mechanism to control a light spot position and the like. The frequencies of the noise components are relatively low, for example, less than about 100 kHz. On the other hand, the frequencies of the signal components including the digital information are within the range of about 100 Hz to 10 MHz. In the range of about 100 Hz to 100 kHz, both the noise components and the signal components are mixed. Therefore, the noise components cannot be sufficiently eliminated from the sum signal Spp1 by using an simple analog high pass filter, while maintaining the signal components in the sum signal Spp1. If the cut-off frequency of the analog high pass filter is set at about 100 kHz, the noise components can be sufficiently eliminated, but the signal components are partly lost. If the cut-off frequency of the analog high pass filter is set at about 100 Hz, the signal components can be maintained, but the noise components cannot be sufficiently eliminated.

The similar problem occurs concerning to the extraction of the control information from the difference signal Spp2.

Furthermore, in different aspect, it is not suitable to use an analog high pass filter for eliminating noise components from the sum signal Spp1. FIG. 5 shows wave forms each representing the signal component containing the digital information. In addition, the scale of the time base in FIG. 5 is different from that in FIG. 4. In FIG. 5, a wave form W1 represents an ideal wave form which corresponds to the pits formed on the DVD-RAM 1. A wave form W2 represents an actual wave form which corresponds to the pits and which is actually generated by the pickup. A wave form W3 represents an actual wave form obtained after the wave form W2 has been treated with the analog high pass filter. A wave form W4 represents an actual wave form obtained by converting the wave form W3 into binary pulse signal.

The pits formed on the DVD-RAM 1 have various lengths. The length of each pit depends on the digital information. Therefore, there is the case where several pits with long lengths are continuously formed on the track on the DVD-RAM 1, and next, several pits with short lengths are continuously formed on the track. In that case, in the wave form W1 shown in FIG. 5, several pulses with long widths Pl continuously appear during the time period T1, and next, several pulses with short widths Ps continuously appear during the time period T2. The broken line avg11 indicates the average of the amplitude of the wave form W1 during the time period T1. The broken line avg12 indicates the average of the amplitude of the wave form W1 during the time period T2. Now, it should be noted that the average of the amplitude of the wave form W1 during the time period T1 is higher than that during the time period T2.

As for the actual wave form W2 corresponding to the ideal wave form W1, the broken line avg21 indicates the average of its amplitude during the time period T1. The broken line avg22 indicates the average of its amplitude during the time period T2. Like the ideal wave form W1, the average of the amplitude of the wave form W2 during the time period T1 is higher than that during the time period T2. The dots on the wave form W2 indicate the zero cross points representing the intersection points of the sum signal Spp1 and the zero level in the amplitude.

As for the actual wave form W3 obtained after the wave form W2 is treated with the analog high pass filter, the broken line avg31 indicates the average of the amplitude during both of the time periods T1 and T2. The dots on the wave form W3 indicate the same zero cross points as those on the wave form W2.

As seen from FIG. 5, if the wave form W2 is treated with the analog high pass filter, the average of the amplitude of the wave form W3 becomes uniform, but the zero cross points are shifted downward (in the negative direction) during the time period T1. Further, during the time period T2, the zero cross points are shifted upward (in the positive direction).

If the wave form W3 is converted into the binary pulse signal on the basis of the average of its amplitude (avg31) in the following manner, the binary pulse signal having the wave form W4 is generated. Namely, it is determined whether or not the amplitude of the wave form W3 is higher than average (avg31); if so, then the level of the pulse signal is made high; if not so, then the level of the pulse signal is made low. As seen from FIG. 5, the pulse widths Pl' and Ps' in the wave form W4 becomes different from the pulse widths Pl and Ps in the original wave form W1. This means that the digital information is undesirably changed by the analog high pass filter. This causes accuracy of reproduction to worsen. A similar problem occurs in the difference signal Spp2.

Furthermore, there is further different problem. To increase a data transfer rate, a technique to change the reproduction speed of the digital information from the DVD-RAM is known. In this technique, the reproduction speed is changed by changing the rotational speed of the DVD-RAM. If the rotational speed of the DVD-RAM is changed, the sum signal and the difference signal are changed in frequency.

However, the cut-off frequency of the simple analog high pass filter is fixed. Therefore, noise components cannot be sufficiently eliminated from the sum signal or the difference signal in the case where the rotational speed of the DVD-RAM 1 is changed.

SUMMARY OF THE INVENTION

It is therefore an object of the present invention to provide an information reproducing apparatus wherein a detection signal having a plurality of different middle levels, which is to be used for reproduction, can be made into a detection signal having a single common middle level.

It is also an object of the present invention to provide an information reproducing apparatus which can eliminate noise components from a detection signal, while maintaining the component necessary for the reproduction contained in the detection signal.

It is further an object of the present invention to provide an information reproducing apparatus which can sufficiently eliminate noise components from a detection signal to be used for reproduction in the case where the reproduction speed is changed.

The above-mentioned objects can be achieved by an information reproducing apparatus in accordance with the present invention. The information reproducing apparatus is an apparatus for generating a detection signal corresponding to information recorded on a recording medium by detecting a light beam reflected by the recording medium, and for reproducing the information by decoding the detection signal. The detection signal includes at least a first component and a second component. The first component has a first middle level. The second component has a second middle level. The first middle level and the second middle level are different from each other.

The information reproducing apparatus includes: a light emitting device that emits the light beam to the recording medium; a detecting device that detects the light beam reflected by the recording medium, and that generates the detection signal including the first component and the second component; a sampling device that samples the first component and the second component included in the generated detection signal; an extraction device that extracts a first sampling value closest to the first middle level from the first component, and that extracts a second sampling value closest to the second middle level from the second component; a signal generation device that generates a first middle level signal by using the extracted first sampling value, and that generates a second middle level signal by using the extracted second sampling value; a compensation device that shifts the first component and the second component such that both the first middle level signal and the second middle sampling signal are matched to a predetermined level; and a decoding device that decodes the compensated first component and the compensated second component to reproduce the information.

In the information reproducing apparatus, the detection signal generated by the detecting device includes at least two component having different middle levels, namely, the first middle level and the second middle level. Such a detection signal is sampled by the sampling device. Then, the extraction device extracts a first sampling value closest to the middle level of the first component from the first component, and then, the signal generation device generates a first middle level signal by using the extracted first sampling value. The first middle level signal represents the actual middle level of the first component. If low frequency noise components are contained in the first component, the first middle level signal is undesirably varied from the normal middle level of the first component.

On the other hand, the extraction device also extracts a second sampling value closest to the middle level of the second component from the second component, and then, the signal generation device also generates a second middle level signal by using the extracted second sampling value. The second middle level signal represents the actual middle level of the second component. If low frequency noise components are contained in the second component, the second middle level signal is undesirably varied from the normal middle level of the second component.

The compensation device then shifts the first component and the second component such that both the first middle level signal and the second middle sampling signal are matched to a predetermined level. Therefore, the middle level of the first component becomes equal to the middle level of the second component, and as a result, the middle level of the whole detection signal is made uniform. Further, relatively low frequency noise components contained in the first component and/or the second component are sufficiently eliminated, while maintaining the first component and the second component.

This detection signal is decoded by the decoding device. Thus, the information recorded on the recording medium is accurately reproduced.

The extraction device may includes: a first value detection device that detects the first current sampling value and the first preceding sampling value, one of which is equal to or less than the first middle level, and the other of which is more than the first middle level, from the first component; and a first sampling value extraction device that extracts one closer to the first middle level from between the detected first current sampling value and the detected first preceding sampling value. Therefore, the first sampling value closest to the middle level of the first component can be extracted.

This extraction may further includes: a second value detection device that detects the second current sampling value and the second preceding sampling value, one of which is equal to or less than the second middle level, and the other of which is more than the second middle level, from the second component; and a second sampling value extraction device that extracts one closer to the second middle level from between the detected second current sampling value and the detected second preceding sampling value. Therefore, the second sampling value closest to the middle level of the second component can be extracted.

The signal generation device may includes: a first accumulating device that accumulates a plurality of the extracted first sampling values; and a first calculating device that calculates an average of the accumulated first sampling values. Therefore, the first middle level signal representing the actual middle level of the first component can be generated.

The signal generation device may further includes: a second accumulating device that accumulates a plurality of the extracted second sampling values; and a second calculating device that calculates an average of the accumulated second sampling values, in order to generate the second middle level signal. Therefore, the second middle level signal representing the actual middle level of the second component can be generated.

The compensation device may includes: a first shift signal generation device that generates a first shift signal corresponding a difference between the first middle level and the predetermined level; a first addition device that adds the first shift signal to the first middle level signal, thereby generating a first level adjustment signal; and a first subtraction device that subtracts the first level adjustment signal from the first component. Therefore, the first component can be shifted such that its middle level is matched to the predetermined level.

The compensation device may further includes: a second shift signal generation device that generates a second shift signal corresponding a difference between the second middle level and the predetermined level; a second addition device that adds the second shift signal to the second middle level signal, thereby generating a second level adjustment signal; and a second subtraction device that subtracts the second level adjustment signal from the second component. Therefore, the second component can be shifted such that its middle level is matched to the predetermined level.

The information reproducing apparatus may further includes: a clock signal generation device that generates a clock signal, and that supplies the clock signal to the sampling device, the extraction device, and the signal generation device in order to synchronize operations of these devices with a frequency of the clock signal; and a frequency changing device that changes the frequency of the clock signal with a reproduction speed of the information. Therefore, the sampling device, the extraction device, and the signal generation device operate while being synchronized with the frequency of the clock signal. As a result, if the frequency of the clock signal is changed with the reproducing speed, the operations of these devices follow it. Accordingly, if the reproducing speed is changed, noise component contained in the detection signal can be sufficiently eliminated, while maintaining the first component and the second component.

The nature, utility, and further feature of this invention will be more clearly apparent from the following detailed description with respect to preferred embodiments of the

DETAILED DESCRIPTION OF THE PREFERRED EMBODIMENTS

Referring to the accompanying drawings, embodiments of the present invention will be described. In the description set forth hereinafter, the present invention is embodied in an information reproducing apparatus for reproducing digital information recorded on a DVD-RAM by the single spiral land/groove recording method.

I. First Embodiment

Referring to FIGS. 6 through 12, the first embodiment of the present invention will be described.

Figure 1:
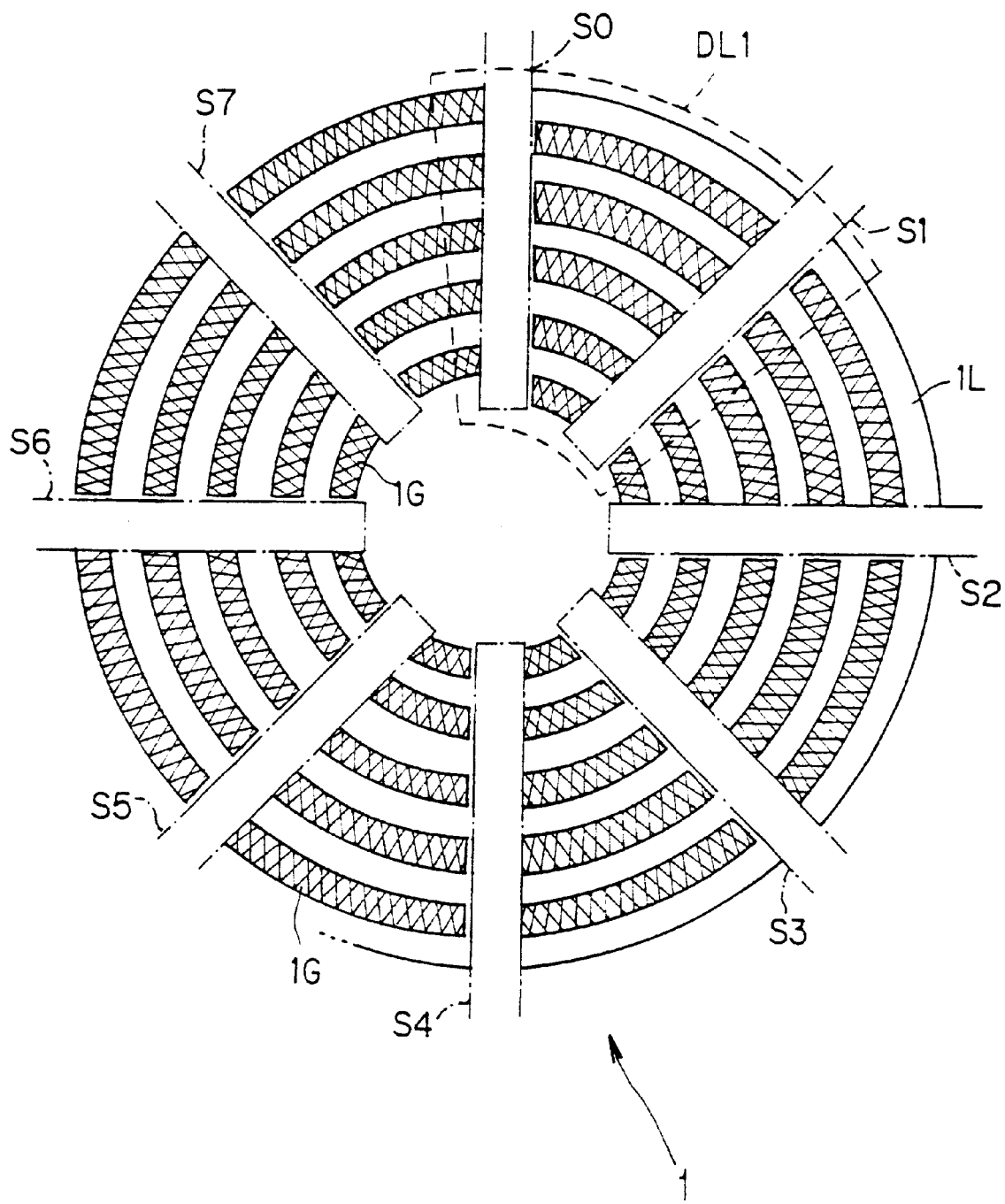
FIG. 1 is a diagram showing a recording surface of a DVD-RAM.
Figure 2:
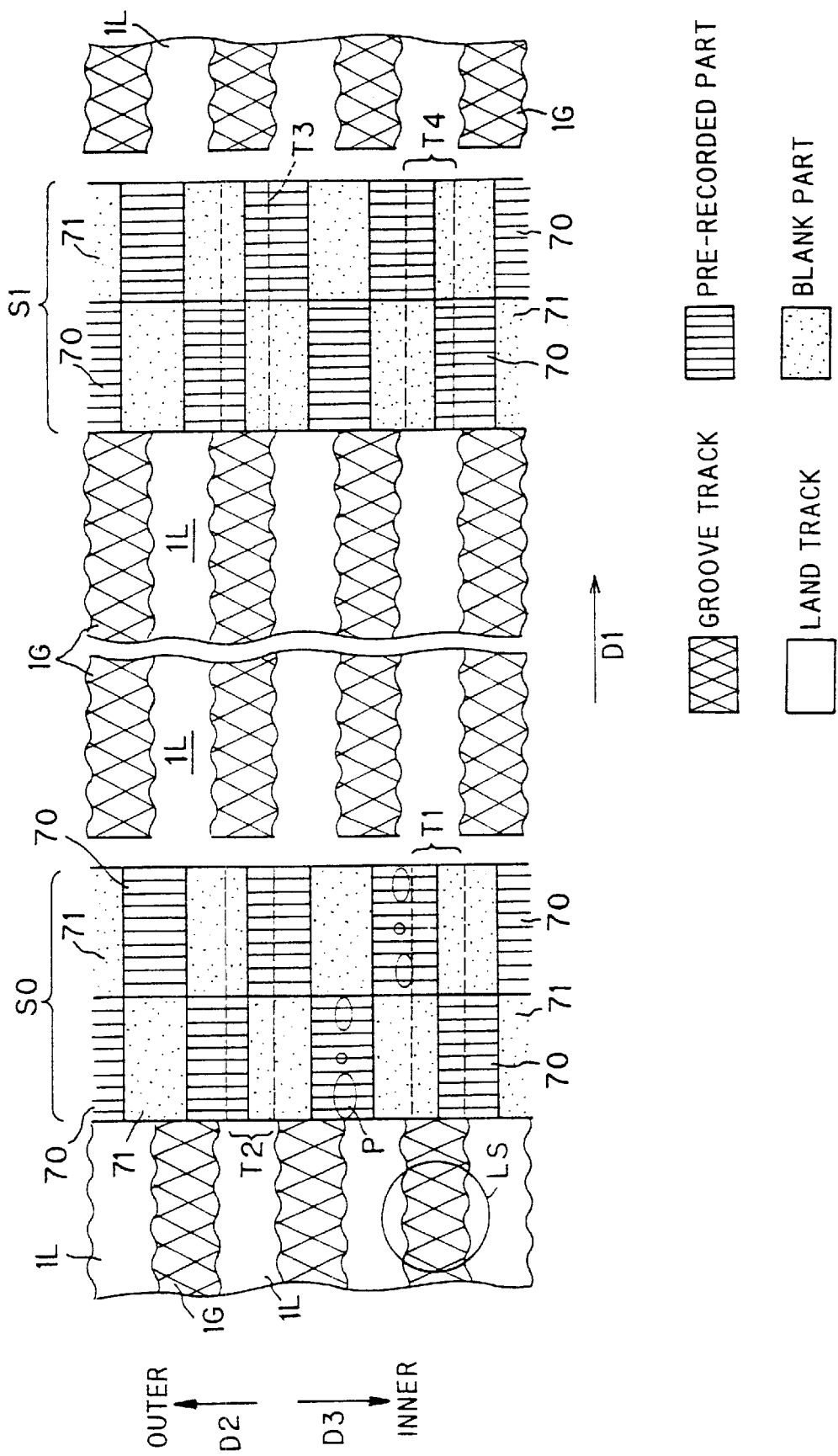
FIG. 2 is an enraged view showing a part of the recording surface of the DVD-RAM.
Figure 6:
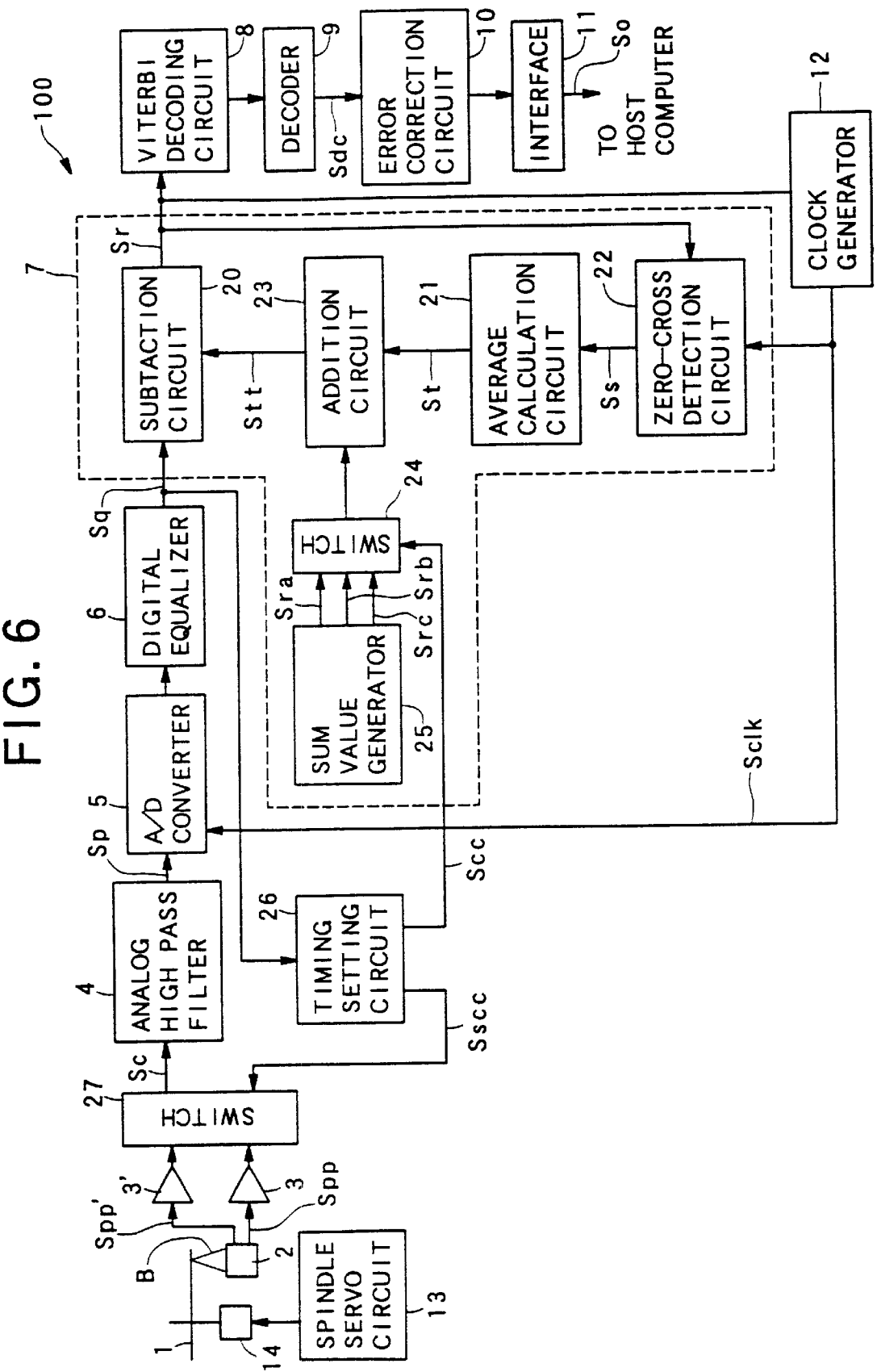
FIG. 6 is a block diagram showing an information reproducing apparatus of a first embodiment of the present invention.

FIG. 6 shows a construction of an information reproducing apparatus 100 of the first embodiment of the present invention. As shown in FIG. 6, the information reproducing apparatus 100 is an apparatus for reproducing digital information recorded on the DVD-RAM 1 by the single spiral land/groove (SS-L/G) recording method. As described above, the DVD-RAM 1 shown in FIG. 1 has the land track 1L, the groove track 1G, and the CIR areas S0–S7 (Control Information Recording areas S0–S7). The digital information to be reproduced is recorded on both of the land track 1L and the groove track 1G. The control information including address information to substantially identify positions on the recording surface of the DVD-RAM 1 is recorded in each of the CIR areas S0–S7. As shown in FIG. 2, each of the CIR areas S0–S7 is divided into the pre-recorded parts 70 and the blank parts 71. The pre-recorded parts 70 and the blank parts 71 are arranged in the predetermined pattern, as shown in FIG. 2. The positional relationship between the pre-recorded parts 70 and blank parts 71 has already been described.

As shown in FIG. 6, the information reproducing apparatus 100 includes a pickup 2, two amplifiers 3, 3', an analog high pass filter 4, an analog-digital (A/D) converter 5, a digital equalizer 6, a digital high pass filter 7, a Viterbi decoding circuit 8, a decoder 9, an error correction circuit 10, an interface 11, a clock generator 12, a spindle servo circuit 13, a spindle motor 14, a timing setting circuit 26, and a switch 27.

The digital high pass filter 7 has a closed loop consisting of a subtraction circuit 20, an average calculation circuit 21, a zero-cross detection circuit 22, and an addition circuit 23. The digital high pass filter further has a switch 24 and a sum value generator 25.

Figure 3:
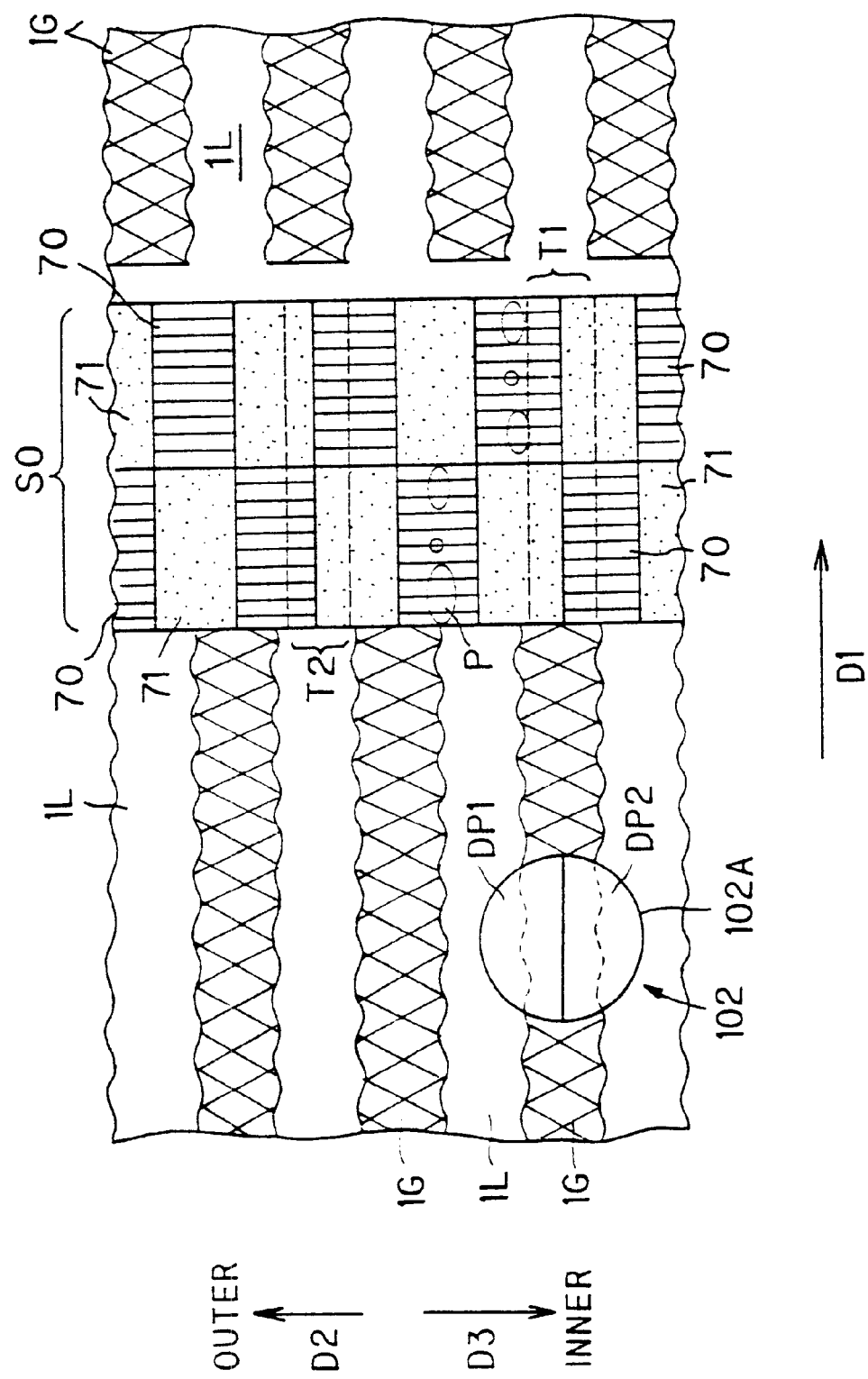
FIG. 3 is a diagram showing positional relationship between a detecting surface of a pickup and a groove track.
Figure 4:
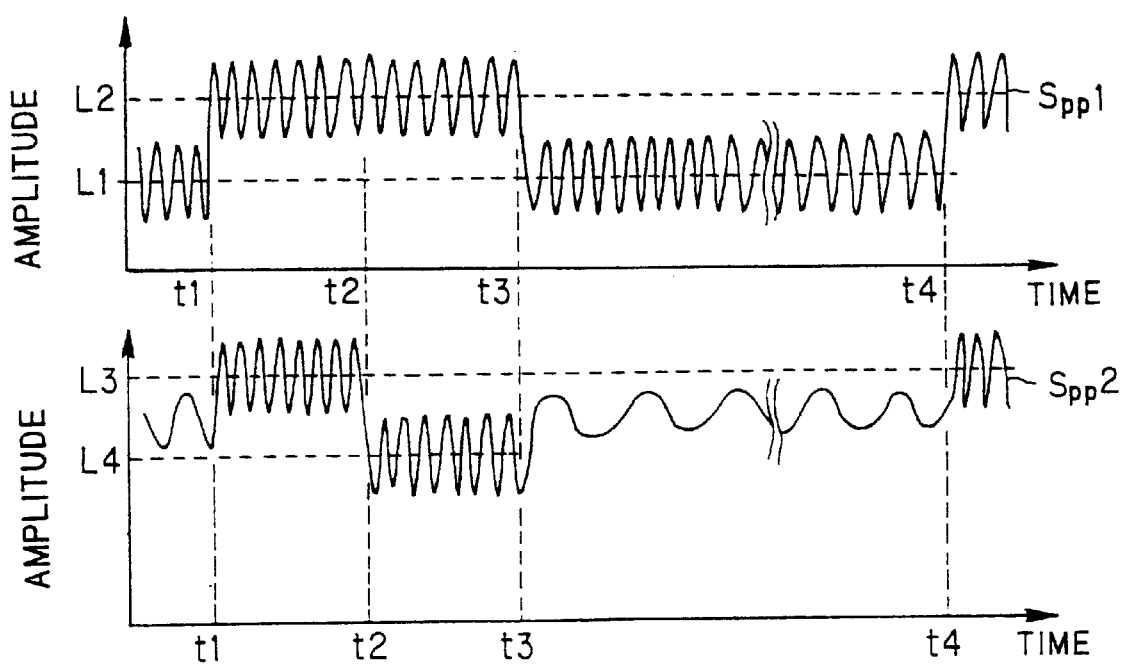
FIG. 4 is a diagram showing a sum signal and a difference signal.

The pickup 2 has a similar construction to the aforementioned pickup 102 (FIG. 3). Like the pickup 102, the pickup 2 has a detecting surface 102 divided into two detection portions DP1 and DP2 by the tangential line of the groove track 1G (land track 1L).

In operation, the spindle motor 14 is driven by the spindle servo circuit 13 under the control of the CPU (not shown). Then, the DVD-RAM 1 on which the digital information to be reproduced is recorded is rotated by the spindle motor 14. In case where the information reproducing apparatus 100 has a function that the reproduction speed is changed, the rotational speed of the DVD-RAM 1 is set so as to match a setting of the reproduction speed.

While the DVD-RAM 1 is rotating, the pickup 2 emits a light beam B, for example, a laser beam onto the recording surface of the DVD-RAM 1, and receives the light beam reflected by the recording surface. The received light beam is detected by the two detecting portions DP1 and DP2 of the pickup 2 (FIG. 3). On the basis of the detected light beam, the pickup 2 reads out the digital information and the control information recorded on the DVD-RAM 1, and generates two detection signals Spp1 and Spp2. The first detection signal Spp1 contains the digital information, and corresponds to the aforementioned sum signal Spp1. The second detection signal Spp2 contains the control information, and corresponds to the aforementioned difference signal Spp2. Furthermore, the frequency band of the signal component of each of the detection signals Spp1 and Spp2 is within the range of 100 Hz to 10 MHz.

In addition, when the pickup 2 emits the light beam B onto the DVD-RAM 1, the position of the light beam B and the focus of the light beam B are controlled by the servo control circuit (not shown) so that the light beam B traces each track and the light beam B is focused on the DVD-RAM 1.

Figure 5:
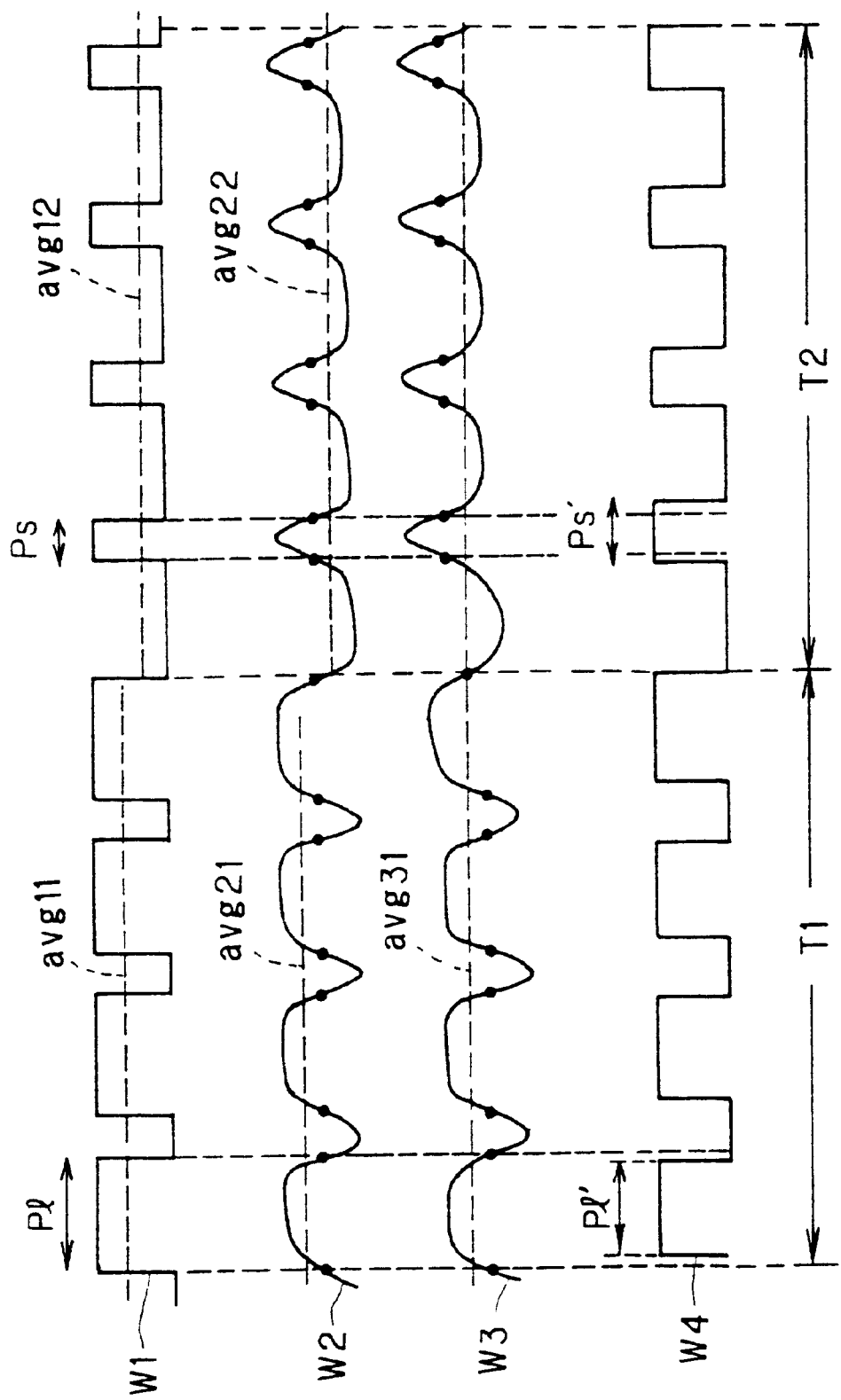
FIG. 5 is a diagram for showing an operation of analog high pass filter.
Figure 7:
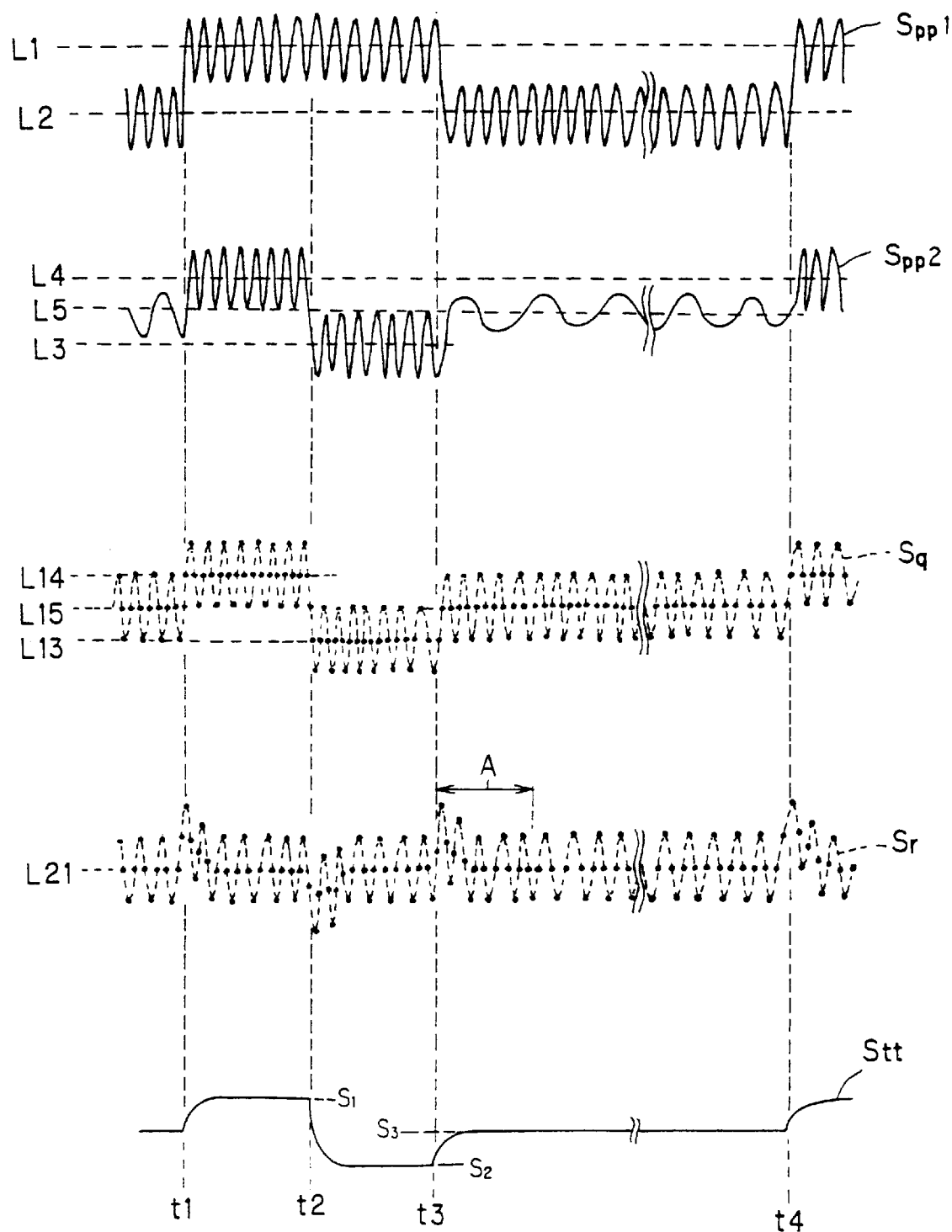
FIG. 7 is a diagram for showing an operation of the information reproducing apparatus of the first embodiment.

FIG. 7 shows the wave forms of the detection signals Spp1 and Spp2. These wave forms are the similar to those in FIG. 5. As shown in FIG. 7, the detection signal Spp1 (sum signal) contains a signal component. This component represents the digital information. While the pickup 2 emits the light beam B onto any one of the CIR areas S0–S7 of the DVD-RAM 1 (during the time period t1–t3), the middle level of the amplitude of the signal component of the detection signal Spp1 is L1. While the pickup 2 emits the light beam B onto either of the groove track 1G and the land track 1L and reads out the digital information (during the time period t3–t4), the middle level of the amplitude of the signal component of the detection signal Spp is L2. Thus, the detection signal Spp1 has two middle levels L1 and L2.

On the other hand, the detection signal Spp2 (difference signal) contains two kinds of signal components. During the time period t1–t3, the detection signal Spp2 contains a signal component representing the control information. During the time period t3–t4, the detection signal Spp2 contains a relatively low frequency component representing wobble information. As mentioned above, the control information is recorded in each of the CIR areas S0–S7. Therefore, while the pickup 2 emits the light beam B onto any one of the CIR areas S0–S7 (during the time period t1–t3), the control information is read out from the CIR area, and it appears as the signal component of the detection signal Spp2. As described above, the pre-recorded part 70 on the left side of the CIR area is located ½ width out of the location of the groove track 1G in the radial direction of the DVD-RAM 1. In contrast, the pre-recorded part 70 on the right side of the CIR area is located ½ width out of the location of the groove track 1G in the opposite radial direction. Therefore, while the pickup 2 emits the light beam B onto the pre-recorded part 70 on the left side (during the time period t1–t2), the middle level of the amplitude of the signal component of the detection signal Spp2 is L3 (or L4). While the pickup 2 emits the light beam B onto the pre-recorded part 70 on the right side (during the time period t2–t3), the middle level of the amplitude of the signal component of the detection signal Spp2 is L4 (or L3). While the pickup 2 emits the light beam B onto either of the groove track 1G and the land track 1L, the middle level of the amplitude of the signal component of the detection signal Spp 2 is L5.

In addition, the signal component of the detection signal Spp2 during time period t3–t4 represents the wobble information. The wobble information is used to generate the synchronization signal to be used for control of the rotational speed of the spindle motor 14. The wobble information is recorded as wobbles of the groove track 1G and the land track 1L, as shown in FIG. 2. The wobble information is read out by the pickup 2 together with the digital information and the control information, and appears in the detection signal Spp2 during the time period t3–t4. incidentally, the wobbles are omitted in FIG. 1.

Referring back to FIG. 6, the detection signals Spp1 and Spp2 are amplified by predetermined amplification factors, respectively, in the amplifiers 3 and 3', and are fed into the switch 27. The detection signals Spp1 and Spp2 are selected by the switch 27, and either detection signal Spp1 or Spp2 is fed into the analog high pass filter 4 as a selection signal Sc. More concretely, the detection signal Spp2 is selected while the pickup 2 is reading out the information from the pre-recorded parts 70. While the pickup 2 is reading out the information from the land track 1L or the groove track 1G, the detection signal Spp1 is selected. The switch 27 is controlled by a control signal Sscc supplied from the timing setting circuit 26.

Next, low frequency noise components contained in the selection signal Sc are reduced by the analog high pass filter 4. Then, the resultant signal is fed into the A/D converter 5 as an analog detection signal Sp. The cut-off frequency of the analog high pass filter 4 is set at 1 kHz, for example. Therefore, attenuation of a low frequency part of each of the digital information and the control information can be sufficiently restricted.

Next, the analog detection signal Sp is sampled by the A/D converter 5 according to a clock signal Sclk having a sampling frequency described below. Next, a level compensation is performed by the digital equalizer 6 on the sampled signal, so that a high frequency component of the sampled signal is raised. The resultant signal is fed as a digital detection signal Sq from the digital equalizer 6 into the digital high pass filter 7 and the timing setting circuit 26. In addition, the reason why the level compensation is performed is because the high frequency component inherently tends to be attenuated.

FIG. 7 also shows the wave form of the digital detection signal Sq. As seen from FIG. 7, the digital detection signal Sq contains a portion corresponding to the digital information which has been contained in the detection signal Spp1 and a portion corresponding the control information which has been contained in the detection signal Spp2, and these portions are sequentially placed in this signal Sq by operation of the switch 27. In addition, in FIG. 7, dots depicted on the digital detection signal Sq represent sampling values of this signal.

The timing setting circuit 26, to which the digital detection signal Sq is input, generates the control signals Sscc and Ssc on the basis of the digital detection signal Sq. Both of the control signals Sscc and Ssc indicate whether the pickup 2 is now reading out the information from the track (the land track 1L or groove track 1G) or the pre-recorded part 70. The control signal Ssc is supplied to the switch 24, and the control signal Sscc is supplied to the switch 27. The timing setting circuit 26 will be described in detail later.

On the other hand, the digital high pass filter 7 eliminates noise components in the digital detection signal Sq, which are caused by disturbance and the like, which remain after the filtering process is carried out by the analog high pass filter 4. The resultant signal is fed into the Viterbi decoding circuit 8 as a compensated digital detection signal Sr. The cut-off frequency of the digital high pass filter 7 is set at 10 kHz, for example. Therefore, the noise components can be sufficiently eliminated by the digital high pass filter 7. However, low frequency parts of both the digital information and the control information are not eliminated by the digital high pass filter 7, as described later. That is, the parts of the digital information and the control information having frequencies that are higher than the cut-off frequency of the analog high pass filter 4 and that are lower than the cut-off frequency of the digital high pass filter 7 are not attenuated by the digital high pass filter 7.

Referring to FIG. 7, an operation of the digital high pass filter 7 will be roughly described. FIG. 7 shows the digital detection signal Sq and the compensated digital detection signal Sr. The digital detection signal Sq is the input signal of the digital high pass filter 7. In contrast, the compensated digital detection signal Sr is the output signal of the digital high pass filter 7. The middle level of the amplitude of the signal component contained in the digital detection signal Sq is varied depending on whether the signal component is the digital information or the control information. That is, the digital detection signal Sq has three different middle levels L13, L14 and L15. In contrast, the compensated digital detection signal Sr has a single common middle level L21. As seen from FIG. 7, the digital high pass filter 7 operates to make the middle levels of the digital detection signal Sq uniform. The operation of the digital high pass filter 7 will be described in more detail later.

Referring back to FIG. 6, the compensated digital detection signal Sr is decoded by the Viterbi decoding circuit 8 by using a Viterbi decoding technique, and then decoded by the decoder 9. Then, the decoded signal is fed into the error correction circuit 10 as a decode signal Sdc.

Next, an error correction is performed by the error correction circuit 10 on the decode signal Sdc, and the resultant signal is output through the interface 11 as an output signal So. The output signal So is supplied to, for example, a host computer (not shown), which is connected with the information reproducing apparatus 100.

On the other hand, the compensated digital detection signal Sr is also supplied to the clock generator 12. In the clock generator 12, the clock signal Sclk is generated on the basis of the frequency and the phase of the compensated digital detection signal Sr. The clock signal Sclk is supplied to the A/D converter 5 and the digital high pass filter 7.

If the reproduction speed is changed, the frequency of the clock signal Sclk is changed according to the selected reproduction speed. More concretely, if the DVD-RAM 1 is reproduced at an ordinary reproduction speed (standard reproduction speed), the frequency of the clock signal Sclk is set at 29 MHz. If the DVD-RAM 1 is reproduced at twice reproduction speed, the frequency of the clock signal Sclk is set at 58 MHz. If the frequency of the clock signal Sclk is changed, the sampling frequency of the A/D converter 5 and the cut-off frequency of the digital high pass filter 7 are changed.

In addition, the clock generator 12 includes: a phase comparator (not shown) for comparing the compensated digital detection signal Sr with the clock signal Sclk in phase; a D/A converter (not shown) for converting the phase difference between the compensated digital detection signal Sr and the clock signal Sclk into a control signal; a low pass filter (not shown) for generating the average of the control signal; and a voltage controlled oscillator (VCO) (not shown) for generating the clock signal Sclk having the frequency that is controlled by the signal output from the low pass filter. In this manner, the clock signal Sclk synchronized with the analog detection signal Sp (compensated digital detection signal Sr) can be generated.

Figure 8:
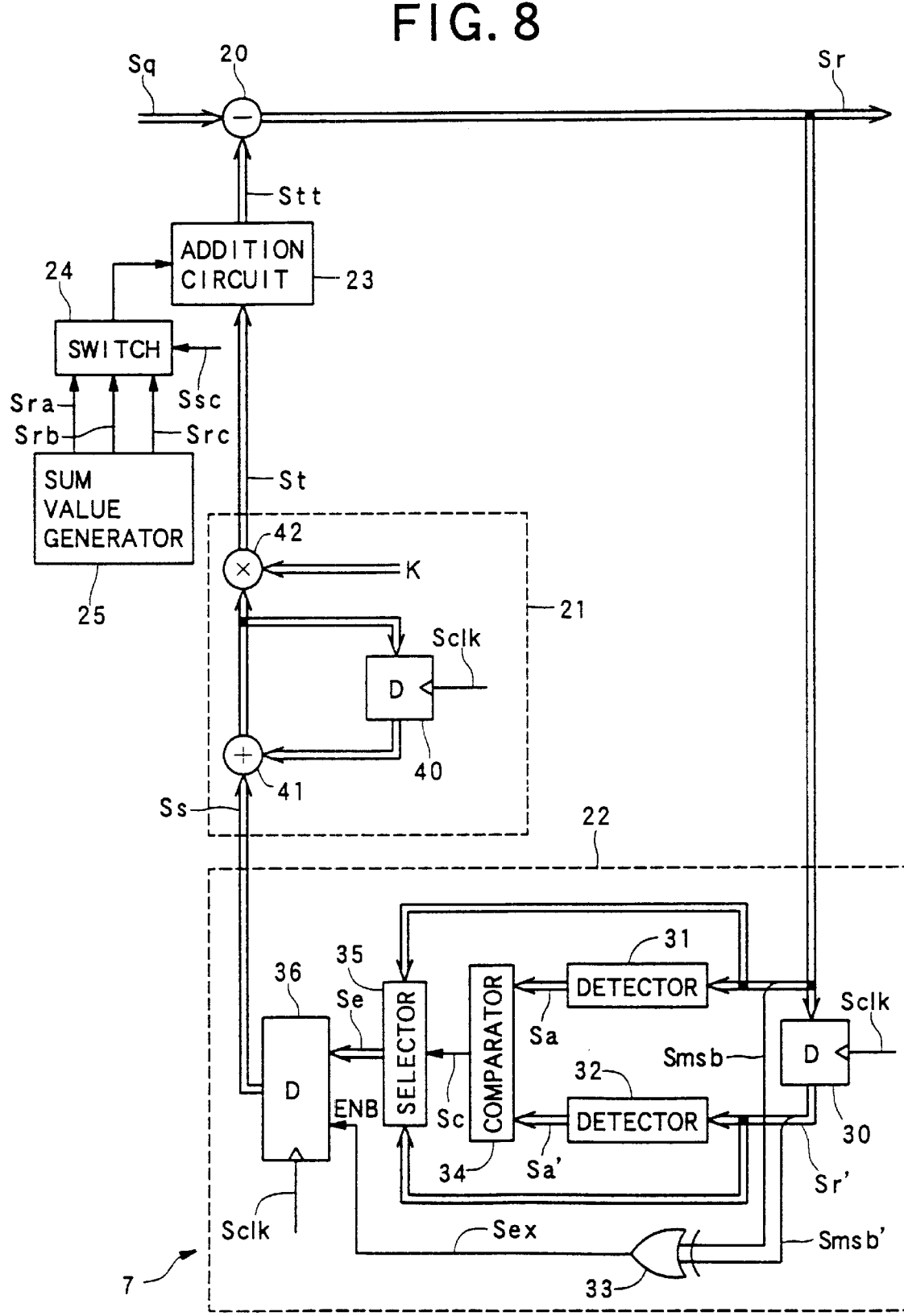
FIG. 8 is a block diagram showing a digital high pass filter of the information reproducing apparatus of the first embodiment.

FIG. 8 shows a construction of the digital high pass filter 7 in detail. As shown in FIG. 8, the average calculation circuit 21 of the digital high pass filter 7 includes a D-flip-flop 40, an adder 41, and a multiplier 42. The zero-cross detection circuit 22 includes a D-flip-flops 30 and 36, an absolute value detectors 31 and 32, an XOR (exclusive or) gate 33, a comparator 34, and a selector 35.

Referring to FIG. 8, an operation of the digital high pass filter 7 will be described. As described above, the digital detection signal Sq, which is generated by sampling the analog detection signal Sp on the basis of the clock signal Sclk, is supplied to the digital high pass filter 7. Then, the digital detection signal Sq is input to the subtraction circuit 20. The subtraction circuit 20 generates the compensated digital detection signal Sr by subtracting a level adjustment signal Stt from the digital detection signal Sq. The level adjustment signal Stt is generated by the zero-cross detection circuit 22, the average calculation circuit 21, and the addition circuit 23, the switch 24, and the sum value generator 25 in the following manner.

The compensated digital detection signal Sr is supplied not only to the Viterbi decoding circuit 8 but also to the zero-cross detection circuit 22 in the digital high pass filter 7.

In the zero-cross detection circuit 22, the compensated digital detection signal Sr is first supplied to the absolute value detector 31. The absolute value detector 31 calculates a first absolute value Sa of the sampling value of the compensated digital detection signal Sr. On the other hand, the compensated digital detection signal Sr is supplied not only to the absolute value detector 31 but also to the D-flip-flop 30. The D-flip-flop 30 delays the supplied compensated digital detection signal Sr by one clock cycle of the clock signal Sclk. The delayed compensated digital detection signal Sr' is fed into the absolute value detection circuit 32. The absolute value detection circuit 32 calculates a second absolute value Sa' of the sampling value of the delayed compensated digital detection signal Sr'.

Thus, the first absolute value Sa is the absolute value of the current sampling value of the compensated digital detection signal Sr. The second absolute value is the absolute value of the preceding sampling value of the compensated digital detection signal Sr. These two absolute values Sa and Sa' are supplied to the comparator 34.

The comparator 34 compares the absolute values Sa and Sa', and selects the smaller one from them. Then, the comparator 34 generates a comparison signal Sc representing the selected absolute value.

On the other hand, when the compensated digital detection signal Sr is input to the zero-cross detection circuit 22, this signal Sr is also supplied to the selector 35. The delayed compensated digital detection signal Sr' is also supplied to the selector 35 from the D-flip-flop 30. Then, the selector 35 selects one of the two signals Sr and Sr', which corresponds to smaller one of the absolute values Sa and Sa', on the basis of the comparison signal Sc. As a result, the sampling value closer to zero is selected between the current sampling value and the preceding sampling value. Then, the selector 35 outputs the sampling value of the selected signal to the D-flip-flop 36 as a minimum sampling signal Se.

Meanwhile, in the zero-cross detection circuit 22, when the compensated digital detection signal Sr is input to the zero-cross detection circuit 22, the MSB (Most Significant Bit) of this signal Sr is supplied to the XOR gate 33 as a first MSB signal Smsb. The MSB of the delayed compensated digital detection signal Sr' is also supplied to the XOR gate 33 from the D-flip-flop 30 as a second MSB signal Smsb'. The first MSB signal Smsb represents the polarity of the current sampling value of the compensated digital detection signal Sr. The second MSB signal Smsb' represents the polarity of the preceding sampling value of the compensated digital detection signal Sr. The XOR gate 33 outputs the gate signal Sx of the high level, if the polarities of these sampling value are different from each other. This means that the level of the gate signal Sx becomes high when the polarity of the compensated digital detection signal Sr is reversed. That is to say, the level of the gate signal Sx becomes high when the level of the compensated digital detection signal Sr changes across its own actual middle level.

Then, the minimum sampling signal Se, the gate signal Sx, and the clock signal Sclk are supplied to the D-flip-flop 36 at the input terminal, the enable terminal, and the clock terminal, respectively. The D-flip-flop 36 outputs the minimum sampling signal Se as a middle level sampling signal Ss to the average calculation circuit 21 when the gate signal Sx is of high level. The output timing of the middle level sampling signal Ss is controlled by the clock signal Sclk.

Next, the average calculation circuit 21 receives the middle level sampling signal Ss. The average calculation circuit 21 has a small closed loop consisting of the adder 41 and the D-flip-flop 40, and the clock signal Sclk is supplied to the D-flip-flop 40. The received middle level sampling signal Ss is supplied to the adder 41. The output signal of the adder 41 is supplied to the D-flip-flop 40, and then the D-flip-flop 40 delays this supplied signal by one clock cycle of the clock signal Sclk. Then, the delayed signal comes back to the adder 41. The adder 41 adds this delayed signal to the middle level sampling signal Ss. Such an operation is repeatedly done in this small closed loop, so that the middle level sampling signal Ss is accumulated one after another, each time the clock pulse of the clock signal Sclk is input. The output signal from the small closed loop is supplied to the multiplier 42. The multiplier 42 multiplies this output signal and a constant "k", where "k" is less than one.

Thus, the average of the middle level sampling signal Ss is calculated in the average calculation circuit 21. The output signal of the average calculation circuit 21 is supplied to the addition circuit 23 as an average signal St.

Meanwhile, the sum value generator 25 generates and outputs three shift signals Sra, Srb, and Src. These shift signals Sra, Srb and Src correspond to the middle levels L14, L13, and L15 of the digital detection signal Sq, respectively. The shift signal Sra is a signal to shift the middle level L14 of the digital detection signal Sq to a common middle level L21 (FIG. 7). The shift signal Srb is a signal to shift the middle level L13 to the common middle level L21. The shift signal Src is a signal to shift the middle level L15 to the common middle level L21. These three shift signals Sra, Srb, and Src are supplied to the switch 24.

The switch 24 selects one from among the three shift signals Sra, Srb, and Src. The switch 24 is controlled by the control signal Ssc supplied from the timing setting circuit 26. As described above, the control signal Ssc indicates whether the pickup 2 is now reading out the information from the track (1L or 1G) or the pre-recorded part 70. Furthermore, the control signal Ssc indicates whether the pickup 2 is now reading out the information from the pre-recorded part 70 on the left side or on the right side of the CIR area. Therefore, for example, when the pickup 2 is reading out the information from the track 1L or 1G, the shift signal Src is supplied from the switch 24 to the addition circuit 23. When the pickup 2 is reading out the information from the pre-recorded area 70 on the left side of the CIR area, the shift signal Sra is supplied to the addition circuit 23. When the pickup 2 is reading out information from the pre-recorded area 70 on the right side of the CIR area, the shift signal Srb is supplied to the addition circuit 23.

The addition circuit 23 adds the supplied shift signal to the average signal St. Thus, the level adjustment signal Stt is generated. The level adjustment signal Stt is shown in FIG. 7. As shown in FIG. 7, the level changes of the level adjustment signal Stt correspond to the changes of the middle levels of the digital detection signal Sq. The level adjustment signal Stt is supplied to the subtraction circuit 20. Then, the level adjustment signal Stt is subtracted from the digital detection signal Sq.

These operations are repeated, synchronized with the clock signal Sclk. By the digital high pass filter 7, two effects can be achieved. (i) The digital detection signal Sq having different middle levels L13, L14, and L15 can be made into the compensated digital detection signal Sr having the single common middle level L21, without attenuating or eliminating the digital information and the control information contained in the digital detection signal Sq. (ii) It is possible to eliminate noise components caused by disturbance, such as variations of reflectance of the DVD-RAM 1, variations of refraction factor of the DVD-RAM 1, an error of the servo mechanism to control the position of the light beam B and the like, from the digital detection signal Sq, without attenuating or elimination the digital information and the control information contained in the digital detection signal Sq. The first effect can be mainly achieved by the subtraction circuit 20, the addition circuit 23, the switch 24, and the sum value generator 25. The second effect can be mainly achieved by the subtraction 20, the average calculation circuit 21, and the zero-cross detection circuit 22.

Figure 9:
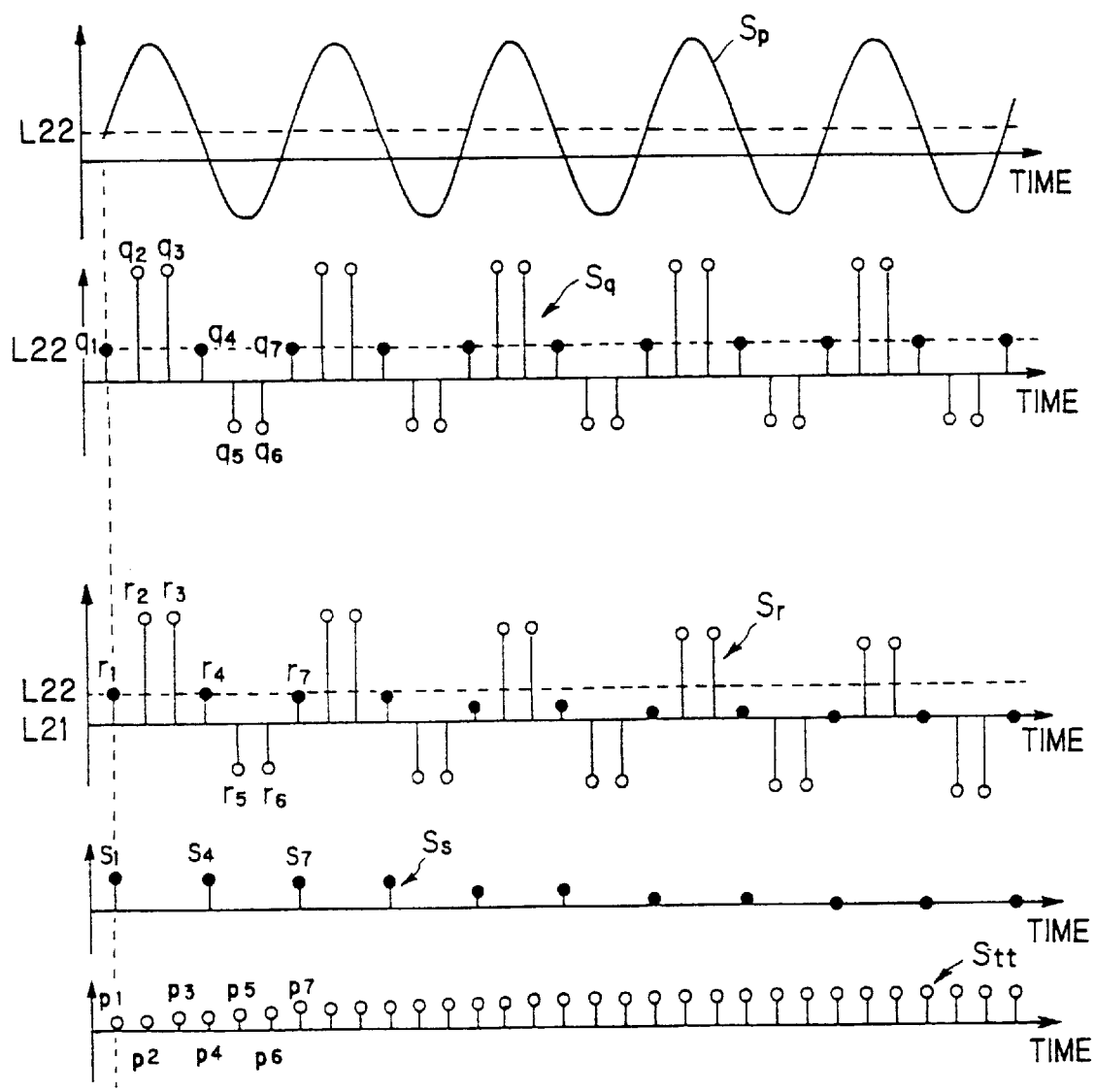
FIG. 9 is a diagram for showing an operation of the digital high pass filter of the first embodiment.

Referring to FIG. 9, the operation of the digital high pass filter 7 to achieve the aforementioned second effect will be described. FIG. 9 shows the wave forms of the analog detection signal Sp, the digital detection signal Sq, the compensated digital detection signal Sr, the middle level sampling signal Ss, and the level adjustment signal Stt during the time period indicated by the arrow A in FIG. 7.

In FIG. 9, it is assumed that the analog detection signal Sp, which is input to the A/D converter 5 (FIG. 6), contains noise components or a DC noise component. As a result, the analog detection signal Sp has the middle level L22. Since the digital detection signal Sq is obtained by analog-digital converting the analog detection signal Sp, the digital detection signal Sq also has the middle level corresponding to the middle level L22. The compensated digital detection signal Sr has the middle level, which is higher than the common middle level L21 at first (at time t3). However, the middle level of the compensated digital detection signal Sr is gradually decreased in such a way that the middle level is matched to the common middle level L21, and thereafter, it is kept constant at the common middle level L21. This means that the noise components are eliminated by the digital high pass filter 7.

At time t3, the sampling value q1 of the digital detection signal Sq is input to the digital high pass filter 7. As the level adjustment signal Stt is zero at this time, the sampling value q1 appears as the sampling value r1 of the compensated digital detection signal Sr.

Then, the sampling value s1 of the middle level sampling signal Ss is generated on the basis of the sampling value r1. Since the output level of the D-flip-flop 40 is zero at this stage, the sampling value s1 is passed through the adder 41, multiplied by the constant "k" (k<1), and added to the shift signal Src. As a result, the sampling value p1 of the level adjustment signal Stt is generated. Then, this sampling value p1 is supplied to the subtraction circuit 20, and it is subtracted from the sampling value q2 of the digital detection signal Sq at the time that the next clock pulse rises.

Next, the sampling value s4 of the middle level sampling signal Ss is generated on the basis of the sampling value r4 of the compensated digital detection signal Sr. The sampling value r4 is obtained by subtracting the sampling value p3 of the level adjusting signal Stt from the sampling value q4 of the digital detection signal Sq. Then, the value held by the D-flip-flop 40 is added to the sampling value s4 in the adder 41, and then, the resultant value is multiplied by the constant "k", and added to the shift signal Src. As a result, the sampling value p4 of the level adjustment signal Stt is generated, and fed into the subtraction circuit 20.

Next, the sampling value s7 of the middle level sampling signal Ss is generated on the basis of the sampling value r7 of the compensated digital detection signal Sr. The sampling value r7 is obtained by subtracting the sampling value p6 of the level adjusting signal Stt from the sampling value q7 of the digital detection signal Sq. Then, the value held by the D-flip-flop 40 is added to the sampling value s7 in the adder 41, and then, the resultant value is multiplied by the constant "k", and added to the shift signal Src. As a result, the sampling value p7 of the level adjustment signal Stt is generated, and fed into the subtraction circuit 20.

The subtraction circuit 20, the average calculation circuit 21, the zero-cross circuit 22, and the addition circuit 23 repeatedly performs such operations. As a result, the sampling value of the level adjustment signal Stt is gradually increased, and thereafter, it is maintained at the constant level. Therefore, the sampling value of the compensated digital detection signal Sr is shifted in such a way that the middle level of the compensated digital detection signal Sr is matched to the common middle level L21. This means that noise components are eliminated from the digital detection signal Sq, while maintaining the signal components.

In addition, it is preferable that the cut-off frequency of the digital high pass filter 7 is high, in order to eliminate noise components caused by the disturbance and to make it fast to return from drop-out or the like. The cut-off frequency of the digital high pass filter 7 is, for example, 10 kHz.

According to the digital high pass filter 7, it is possible to eliminate noise components from the digital detection signal Sq, while maintaining the digital information and the control information. If both of the noise components and the signal components including the digital information and control information exist within the frequency range that is higher than the cut-off frequency of the analog high pass filter 4 and that is lower than the cut-off frequency of the digital high pass filter 7, it is possible to eliminate only the noise components, and to maintain the signal components.

Next, an operation of the digital high pass filter 7 when the frequency of the clock signal Sclk is varied with changes of the reproduction speed.

The transfer function G(z) of the average calculation circuit 21 is given as:

$$G(z)=k/(1-z^{-1}). \quad (1)$$

Therefore, the transfer function H(z) of the whole of the digital high pass filter 7 is given as:

$$H(z) = 1/(1 + G(z)) \quad (2)$$
$$= (1 - z^{-1})/(1 - z^{-1} + k).$$

The "z" is gives as:

$$z=\exp(j\omega T), \quad (3)$$

where the "ω" is an angular frequency, and the "T" is the frequency of the clock signal Sclk. Therefore, the frequency transfer function H(ω) is given as:

$$H(\omega) = (1 - \exp(-j\omega T))/(1 - \exp(-j\omega T) + k) \quad (4)$$
$$= (1 - \cos\omega T + j\sin\omega T)/(1 - \cos\omega T + j\sin\omega T + k).$$

Then, $$\omega=2\pi f, \; T=1/fs,$$

where the "f" is a frequency, the "fs" is a frequency of the clock signal Sclk. Accordingly, the frequency transfer function H(f) is give as:

$$H(f) = (1 - \cos(2\pi f/fs) + \quad (5)$$
$$j\sin(2\pi f/fs))/(1 - \cos(2\pi f/fs) + j\sin(2\pi f/fs) + k).$$

As seen from the expression (5), the frequency transfer function of the digital high pass filter 7 is a function based on the (f/fs). Therefore, the frequency transfer function of the digital high pass filter 7 is automatically determined depending on the frequency fs of the clock signal Sclk. This frequency transfer function corresponds to the cut-off frequency of the digital high pass filter 7. Hence, the cut-off frequency of the digital high pass filter 7 can be changed according to the frequency of the clock signal Sclk.

Figure 10:
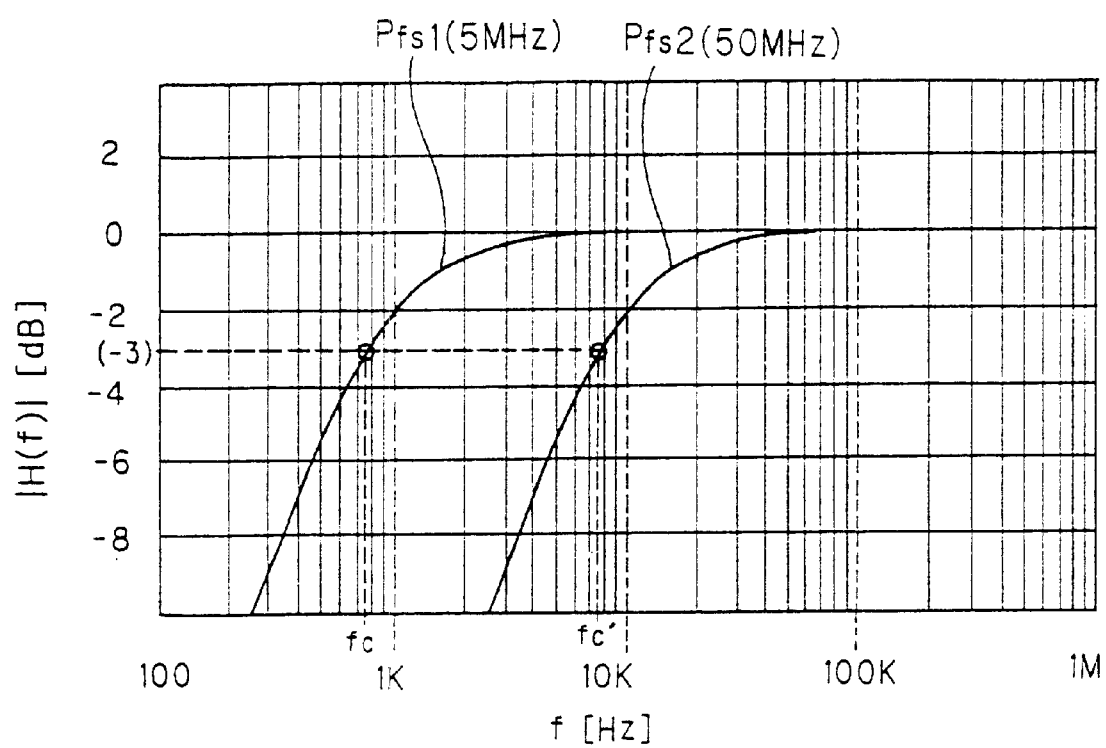
FIG. 10 is a diagram showing frequency properties of the digital high pass filter of the first embodiment.

FIG. 10 shows the frequency properties of the digital high pass filter 7. If the frequency of the clock signal Sclk is 5 MHz, the frequency property of the digital high pass filter 7 is shown as a curve Pfs1. If the frequency of the clock signal Sclk is 50 MHz, the frequency property of the digital high pass filter 7 is shown as a curve Pfs2. As seen from FIG. 10, if the frequency fs of the clock signal Sclk is increased by 10 times, the cut-off frequency of the digital high pass filter 7 is increased by 10 times. Thus, the cut-off frequency of the digital high pass filter 7 is changed in proportion to the frequency of the clock signal Sclk. Furthermore, if the cut-off frequency is changed, the frequency property curve is almost maintained. In addition, in FIG. 10, the frequency fc is the cut-off frequency of the digital high pass filter 7 when the frequency of the clock signal Sclk is 5 MHz. The frequency fc' is the cut-off frequency of the digital high pass filter 7 when the frequency of the clock signal Sclk is 50 MHz.

Figure 11:
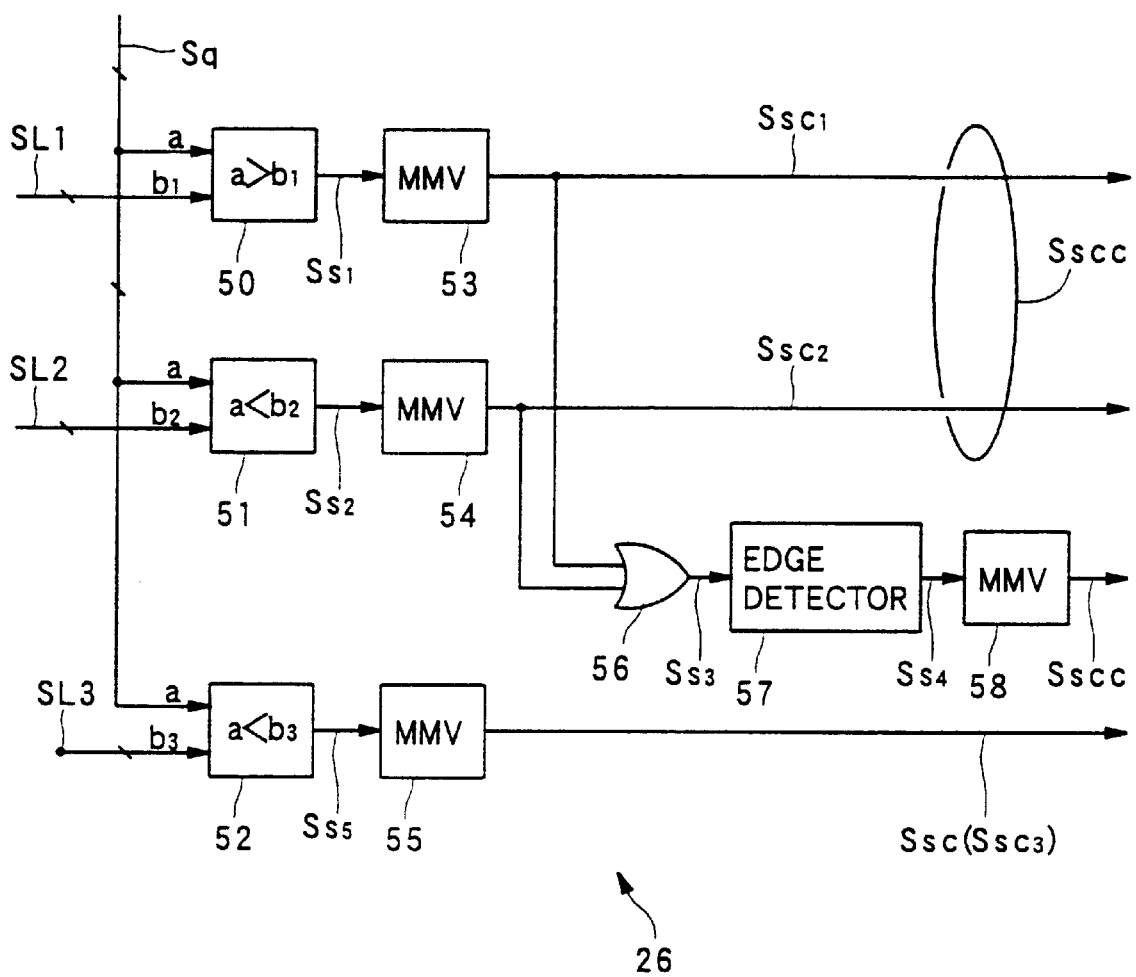
FIG. 11 is a diagram showing a timing setting generator of the information reproducing apparatus of the first embodiment.
Figure 12:
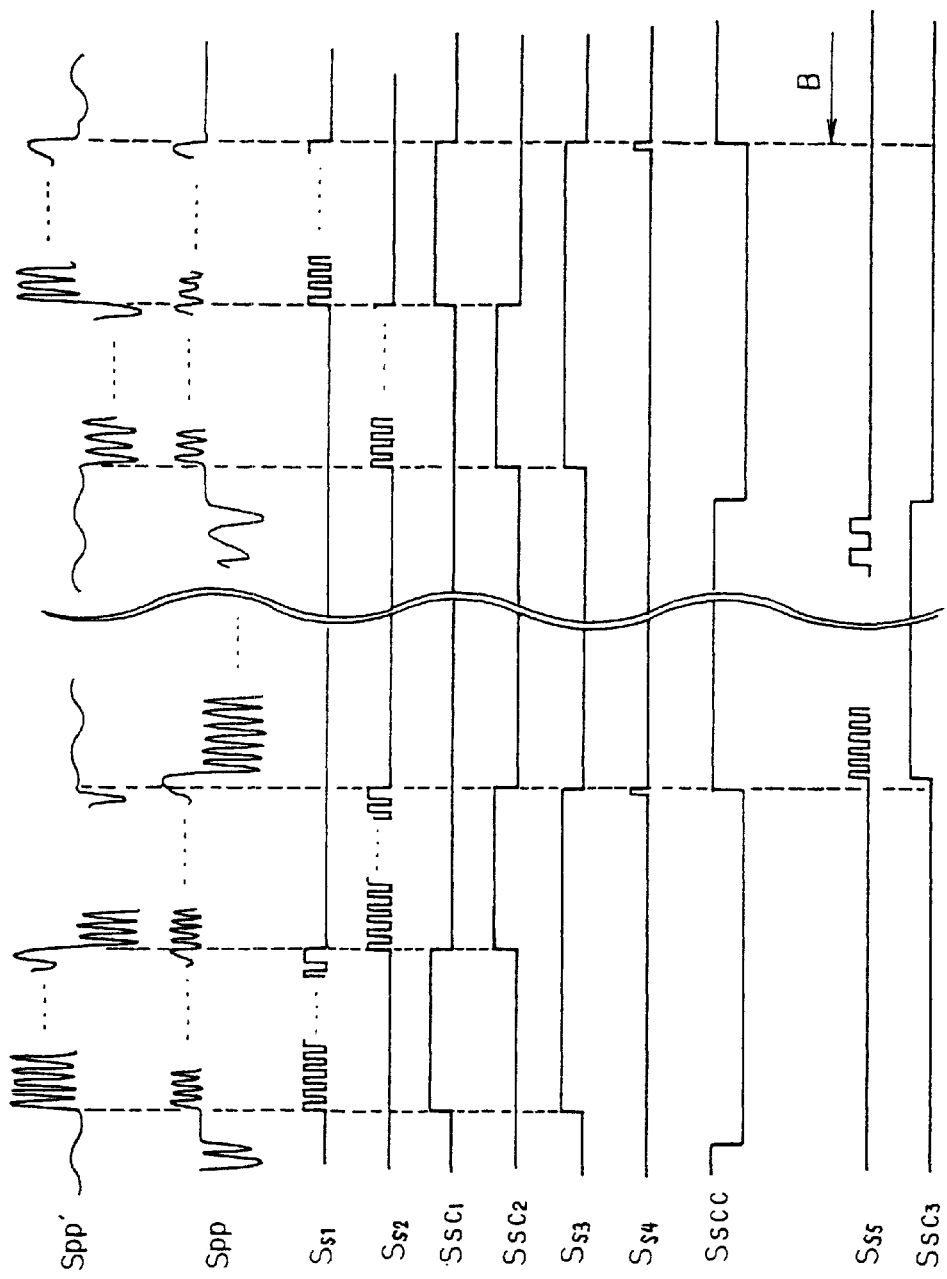
FIG. 12 is a diagram for showing an operation of the timing setting generator of the first embodiment.

Referring to FIGS. 11 and 12, the timing setting generator 26 will be described in detail. As shown in FIG. 11, the timing setting generator 26 includes three comparators 50, 51 and 52, four monostable multi vibrator (MMV) 53, 54, 55 and 58, an OR gate 56 and an edge detector 57.

A first reference signal SL1 is applied to the comparator 50. This reference signal SL1 is a signal to detect the middle level L14 of the digital detection signal Sq. A second reference signal SL2 is applied to the comparator 51. This reference signal SL2 is a signal to detect the middle level L13 of the digital detection signal Sq. A third reference signal SL3 is applied to the comparator 52. This reference signal SL3 is a signal to detect the middle level L15 of the digital detection signal Sq.

When the output signal Ssc1 is output from the MMV 53 as the control signal Ssc, the shift signal Sra is selected by the switch 24. When the output signal Ssc2 is output from the MMV 51 as the control signal Ssc, the shift signal Srb is selected by the switch 24. When the output signal Ssc3 is output from the MMV 56 as the control signal Ssc, the shift signal Src is selected by the switch 24. The output signal from the MMV 58 is used as the control signal Sscc to control the switch 27.

The timing setting generator 26 operates as follows. When reproduction of the DVD-RAM 1 is started, the rotation of the spindle motor 14 is not unstable. At this time, the timing setting generator 26 outputs the control signal Sscc to the switch 27 in order to output only the detection signal Spp1.

When the rotation of the spindle motor 14 becomes stable, the CIR areas is detected, and the servo controls of the pickup 2 is established. As a result, the digital detection signal Sq is normally supplied to the timing setting generator 26. Then, the comparator 50 compares the middle level of the digital detection signal Sq with the reference signal SL1. If the pickup 2 reads out the information from the pre-recorded area 70 on the left (or right) side of the CIR area, the middle level of the digital detection signal Sq is greater than the reference signal SL1. If so, the comparator 50 outputs an output signal Ss1 to the MMV 53, and then, the MMV 53 outputs the output signal Ssc1 to the switch 24.

While the comparator 50 performs such an operation, the comparator 51 compares the middle level of the digital detection signal Sq with the reference signal SL2. If the pickup 2 reads out the information from the pre-recorded area 70 on the right (or left) side of the CIR area, the middle level of the digital detection signal Sq is lower than the reference signal SL2. if so, the compactor 51 outputs an output signal Ss2 to the MMV 54, and then, the MMV 54 outputs the output signal Ssc2 to the switch 24.

At this time, the output signals Ssc1 and Ssc2 are supplied to the OR gate 56. The OR gate 56 generates the output signal Ss3, whose level is high only while the pickup 2 is reading out the information from the CIR area, to the edge detector 57. The edge detector 57 detects the time that the level of the output signal Ss3 is switched over from the high level to the low level, and outputs the output signal Ss4 indicating that time. Then, the MMV 58 generates the control signal Sscc, whose level becomes high while the pickup 2 is reading out the digital information from the track and becomes low while the pickup 2 is reading out the control information from the CIR area. Then, this control signal Sscc is supplied to the switch 27, so that the detection signals Spp1 and Spp2 are switched over to each other.

While the comparators 50 and 51 are performed such operations, the comparator 52 compares the middle level of the digital detection signal Sq with the reference signal SL3. If the pickup 2 reads out the digital information from the track, the middle level of the digital detection signal Sq is lower than the reference signal SL3. If so, the comparator 52 outputs the output signal Ss5 to the MMV 55. Then, the MMV 55 outputs the output signal Ssc3 to the switch 24.

In addition, during the time period indicated by the arrow B in FIG. 12, the detection signals Spp1 and Spps are not changed, so that the level of the output signal Ssc3 is low. Therefore, the shift signal Src is not selected by the switch 24.

As can be understood from the above, in the information reproducing apparatus 100, (i) the different middle levels L13, L14 and L15 of the digital detection signal Sq can be shifted so as to match all of these different middle levels to the single common middle level L21, without attenuating or eliminating the digital information and the control information; and (ii) noise component can be sufficiently eliminated from the digital detection signal Sq, without attenuating or eliminating the digital information and the control information. Therefore, it is possible to enhance accuracy of the reproduction of the digital information and the control information.

As discussed above, the digital high pass filter 7 has the closed loop structure to compensate the digital detection signal Sq. By this closed loop structure, the accurate compensate digital detection signal Sr can be generated. This enables the accurate reproduction of the digital information and the control information.

Furthermore, the digital high pass filter 7 performs the above-mentioned operation in digital. Therefore, it is possible to produce the digital high pass filter as a small size chip, and to realize the high speed operation.

Moreover, the cut-off frequency of the digital high pass filter 7 is set at a high frequency value, for example, 10 kHz. Therefore, if the detection signal Spp1 or Spp2 is partly lost due to drop-out or the like, the digital detection signal Sr is rapidly compensated.

Moreover, the cut-off frequency of the digital high pass filter 7 can be varied with the frequency of the clock signal Sclk. Therefore, if the frequencies of the detection signals Spp1 and Spp2 are changed by changing the reproduction speed, noise components can be sufficiently eliminated from the digital detection signal Sq.

Moreover, the aforementioned average calculation circuit 21 uses the multiplier 42 to multiply the middle level sampling signal Ss by the constant "k". The "k" is generally less than one. As an alternative to the multiplier 42, a means for shifting bits of the output signal from the adder 41 can be used. In that case, the "k" is defined as:

$$k=1/2n. \tag{6}$$

where the "n" is natural number. The bits of the output signal from the adder 41 are shifted by "n". According to this, it is possible to simplify the construction of the average calculation circuit 21.

II. Second Embodiment

Figure 13:
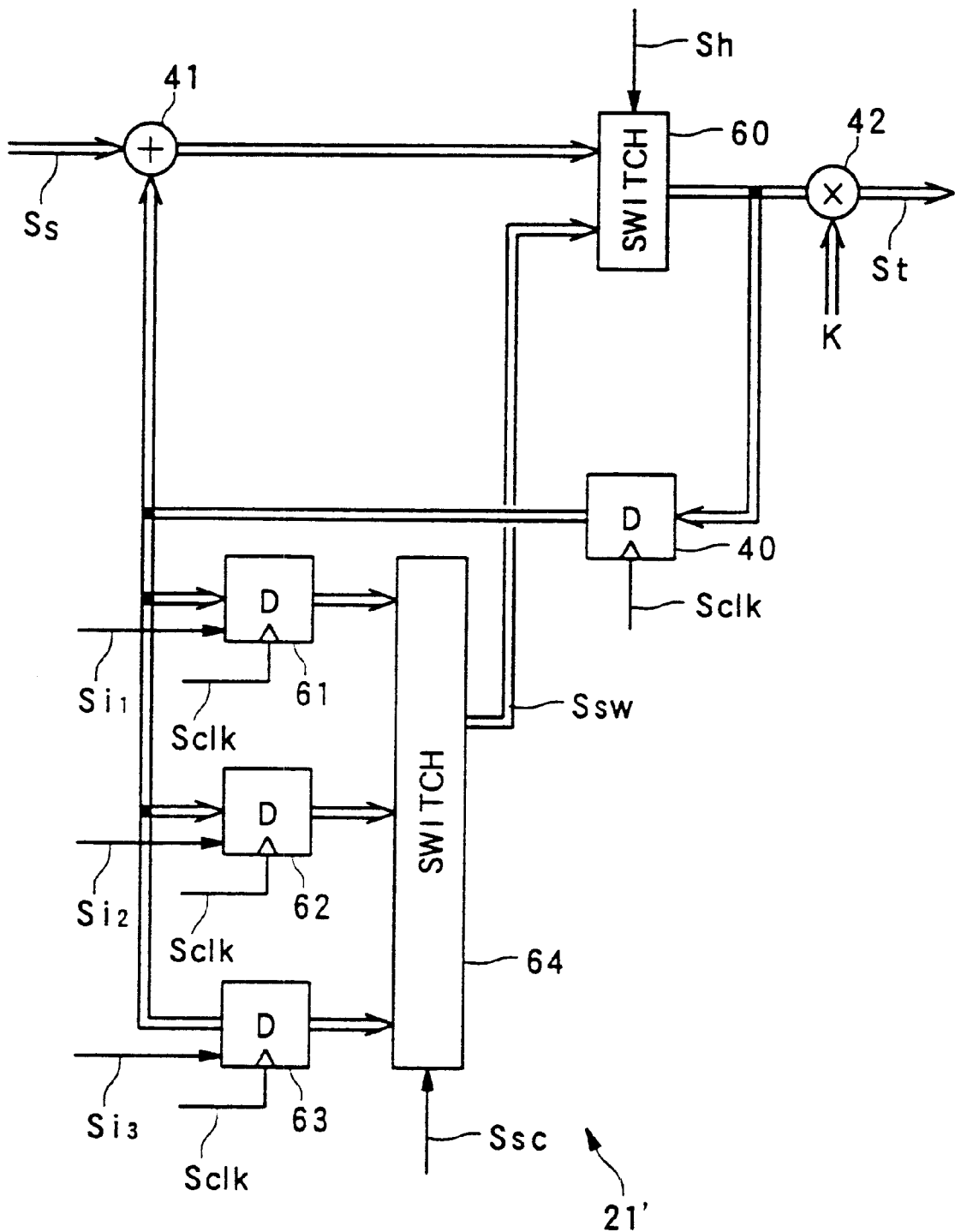
FIG. 13 is a block diagram showing an average calculation circuit of a second embodiment of the present invention.
Figure 14:
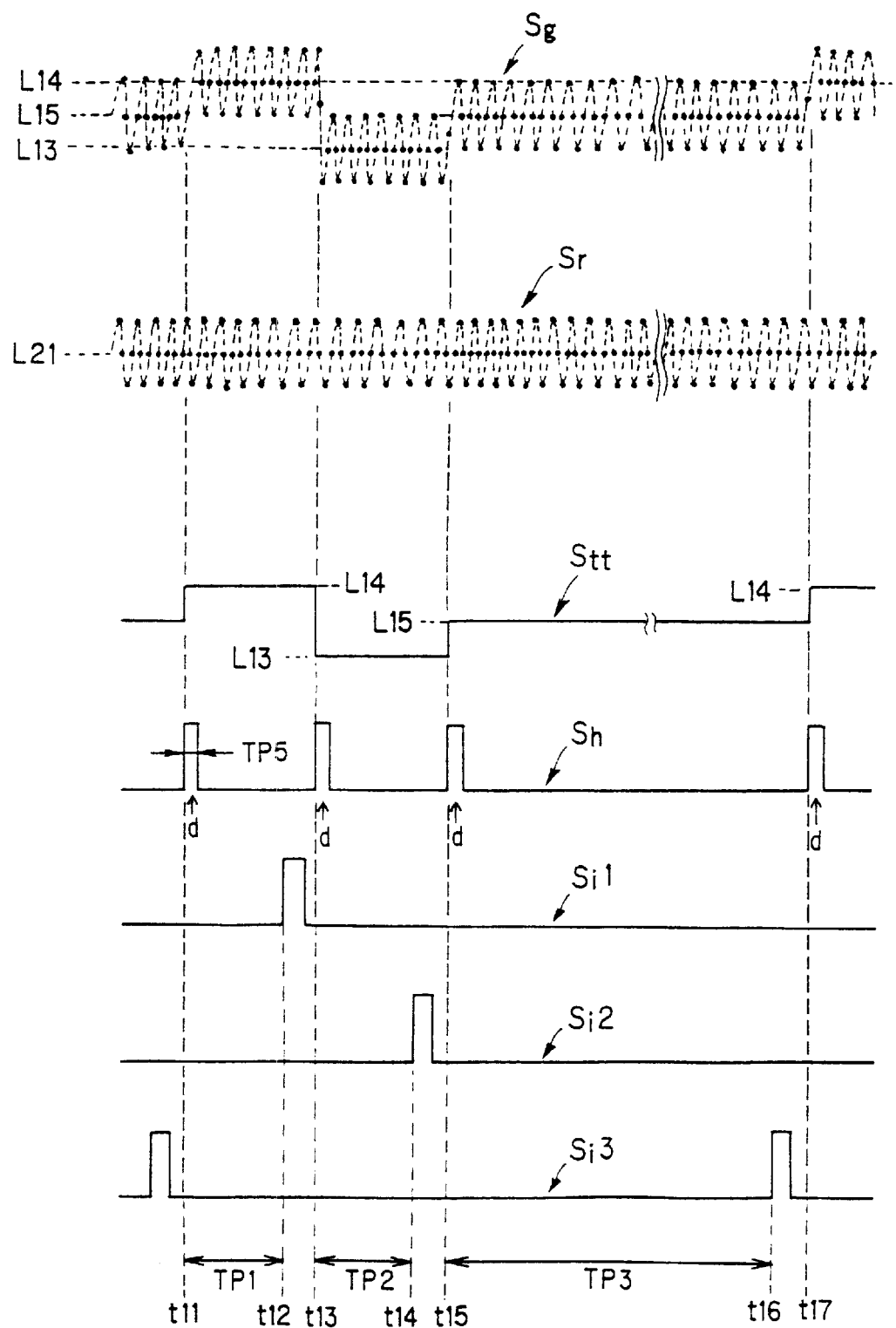
FIG. 14 is a diagram for showing an operation of the average calculation circuit of the second embodiment.

Referring to FIGS. 13 and 14, the second embodiment of the present invention will be described. The information reproducing apparatus of the second embodiment is the same as the information reproducing apparatus 100 of the first embodiment except for the average calculation circuit of the digital high pass filter.

In the average calculation circuit 21 of the digital high pass filter 7 of the first embodiment, the middle level sampling signal Ss is accumulated each time the clock pulse of the clock signal Sclk is input, in order to generate the average signal St. In contrast, in the average calculation circuit 21' of the second embodiment, the past average signal St is used in order to make the average signal St more stable.

The average calculation circuit 21' has the D-flip-flops 40, 61, 62, 63, the adder 41, the multiplier 42, and switches 60, 64. Like the average calculation circuit 21 of the first embodiment, the middle level sampling signal Ss is input to the adder 41. This signal Ss is supplied to the multiplier 42 and the D-flip-flop 40 through the switch 60. Then, the multiplier 42 outputs the average signal St. On the other hand, the middle level sampling signal Ss supplied to the D-flip-flop 40 returns to the adder 41. This signal Ss is further supplied to the three D-flip-flops 61, 62 and 63. Timing control signals Si1, Si2, and Si3 are also supplied to the D-flip-flop 61, 62, and 63, respectively.

Referring to FIG. 14, the middle level of the digital detection signal Sq is varied to the level L14 at time t11. When the time period TP1 has passed from time t11, the middle level sampling signal Ss is stabilized by the closed loop consisting the D-flip-flop 40, the adder 41, and the switch 60. At time t12, the level of the timing control signal Si1 is switched over to the high level. In response to this, the middle level sampling signal Ss is held by the D-flip-flop 61.

At time t13, the middle level of the digital detection signal Sq is varied from the level L14 to the level L13. When the time period TP2 has passed from time t13, the middle level sampling signal Ss is stabilized by the closed loop consisting the D-flip-flop 40, the adder 41, and the switch 60. At time t14, the level of the timing control signal Si2 is switched over to the high level. In response to this, the middle level sampling signal Ss is held by the D-flip-flop 62.

At time t15, the middle level of the digital detection signal Sq is switched over from the level L13 to the level L15. When the time period TP3 has passed from time t15, the middle level sampling signal Ss is stabilized by the closed loop consisting the D-flip-flop 40, the adder 41, and the switch 60. At time t16, the level of the timing control signal Si3 is switched over to the high level. In response to this, the middle level sampling signal Ss is held by the D-flip-flop 63.

The output signals from the D-flip-flops 61, 62, and 63 are selected by the switch 64 according to the control signal Ssc as follow. The output signal from the D-flip-flop 61 is firstly selected while the pickup 2 is reading out the information from the pre-recorded part 70 on the left side of the CIR area (during t11–t13). The output signal from the D-flip-flop 62 is secondly selected while the pickup 2 is reading out the information from the pre-recorded part 70 on the right side of the CIR area (during t13–t15). The output signal from the D-flip-flop 63 is selected while the pickup 2 is reading out the information from the track 1G or 1L (during t15–t17). The selected output signal is supplied to the switch 60 as the selection signal Ssw. This selection signal Ssw and the middle level sampling signal Ss supplied from the adder 41 are selected by the switch 60 according to a control signal Sh. By the operation of the switch 60, the selection signal Ssw is supplied to the multiplier 42, only while the level of the control signal Sh is high. As seen from FIG. 14, the level of the control signal Sh is kept high in a predetermined short time period TP5 immediately after the middle level of the digital detection signal Sq is varied (at time t11, t13, t15). If the level of the control signal Sh becomes low, the middle level sampling signal Ss is supplied to the multiplier 42.

Thus, the stable middle level sampling signal Ss is partly memorized (stored) by each of the D-flip-flops 61, 62, and 63, and these parts of the memorized middle level sampling signal Ss are used to generate the average signal St. More concretely, as shown in FIG. 14, the signal memorized by the D-flip-flop 61 is used during the time period TP5 immediately after time t11. The signal memorized by the D-flip-flop 62 is used during the time period TP5 immediately after time t13. The signal memorized by the D-flip-flop 63 is used during the time period TP5 immediately after time t15. The middle level sampling signal Ss is directly used during the time period except for the time period TP5. Therefore, the average signal St can be quickly stabilized when the middle level of the digital detection signal Sq is varied. As a result, the level of the level adjustment signal Stt is sharply shifted, as shown in FIG. 14. Accordingly, it is possible to make the common middle level L21 of the compensated digital detection signal Sr more stable, as shown in FIG. 14.

The information reproducing apparatuses of the above mentioned embodiments may be modified without departing from the spirit or essential characteristics of the present invention.

In the average calculation circuit 21 or 21', the whole of the sampling value of the middle level sampling signal Ss is accumulated one after another. However, the present invention is not limited to this. The bit indicating the polarity of the sampling value of the middle level sampling signal Ss may only be accumulated. If this modification is adopted, the number of bits of the adder 41 and the D-flip-flop 40 can be reduced.

Furthermore, the output of the zero cross-detecting circuit 21 or 21' (the middle level sampling signal Ss) may be suspended (the output level may be set at zero), if the inversion of the polarity of the compensated digital detection signal Sr does occur for more than predetermined time period. If this modification is adopted, it is possible to maintain the normal level of the middle level sampling signal Ss in the average calculation circuit 21 or 21' if long drop-out occurs. That is, it can be prevented that an error signal is accumulated by the closed loop of the average calculation circuit 21 or 21'.

For the same purpose, the middle level sampling signal Ss may be output only during the time period corresponding to one cycle of the clock signal Sclk immediately after the polarity of the compensated digital detection signal Sr is reversed.

Moreover, in order to prevent that the error signal is accumulated by the closed loop of the average calculation circuit 21 or 21', a signal limiting device; such as a limiter, may be connected to the output of the adder 41.

Moreover, the gate signal Sx output from the XOR gate 33 of the zero-cross detection circuit 22 may be supplied to the D-flip-flop 40, instead of the clock signal Sclk. Therefore, the middle level sampling signal Ss can be accumulated by the closed loop of the average calculation circuit 21 or 21' only when the polarity of the compensated digital detection signal Sr is reversed.

Moreover, in the aforementioned embodiments, the digital high pass filter 7 compensates the middle level of the digital detection signal Sq by using the feed back of the compensated digital detection signal Sr by using the closed loop structure. The present invention may be embodied in a different digital high pass filter without the closed loop. In this digital high pass filter, the digital detection signal Sq is directly input to the zero-cross detection circuit 22, and then, the zero-cross sampling values are extracted from this digital detection signal Sq, and then, the extracted values are directly (without calculation of the average) subtracted from each sampling value of the original digital detection signal Sq.

Moreover, the present invention may be adapted to an information recording apparatus for recording digital information onto a DVD-RAM while reading out control information from the pre-recorded parts of the DVD-RAM.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-047980 filed on Feb. 27, 1998 including the specification, claims, drawings and summary is incorporated herein by reference in its entirety.

What is claimed is:

1. An apparatus for generating a plurality of types of detection signals corresponding to information recorded on a recording medium by detecting a light beam reflected from the recording medium, and for reproducing the information by decoding the detection signals, the detection signals each having a different middle level corresponding to its signal type, the apparatus comprising:

a light emitting device that emits the light beam to the recording medium;

a light beam detecting device that detects the light beam reflected from the recording medium, and that generates the detection signals;

a sampling device that samples each of the generated detection signals;

a level adjustment signal generating device that determines the type of the sampled detection signal, generates a level adjustment signal based on the middle level that corresponds to the determined signal type, and subtracts the level adjustment signal from the sampled detection signal to produce a compensated detection signal;

a decoding device that decodes the compensated detection signal to reproduce the information, wherein said level adjustment signal generating device comprises:

a middle level detection circuit that detects a minimum middle level signal when the polarity of a sampling value included in the compensated detection signal with respect to the middle level reverses between adjacent sampling values, and outputs the detected signal as a middle level sampling signal;

an average calculating circuit for calculating averages of the middle level sampling signals supplied thereto from the middle level detection circuit and outputting average middle level signals;

shift signal generating circuitry that generates a middle level shift signal based on the middle level corresponding to the determined signal type; and an adding device that adds the generated middle level shift signal to the average middle level signals.

2. The apparatus according to claim 1, wherein said average calculating circuit comprises:

a delay loop;

an adder having a first input supplied with the middle level sampling signal, and a second input; and a multiplier supplied with an output of the adder, wherein the delay loop delays an output of the adder and supplies the delayed output to the second input of the adder.

3. The apparatus according to claim 1 further comprising:
a clock signal generation device that generates a clock signal, and that supplies the clock signal to the sampling device and the level adjustment signal generating device in order to synchronize operations of these devices with a frequency of the clock signal, wherein the frequency of the clock signal generated by the clock signal generating device changes in accordance with a reproduction speed of the information.

4. An apparatus for reproducing information from a recording disk by emitting a light beam onto a recording track formed on the recording disk, the information including at least first information to be reproduced and second information for controlling the reproduction of the first information, the first information being recorded on the recording track, the second information being recorded on a recording area formed on the recording disk, the recording area being located a predetermined distance out of a location of the recording track in a radial direction of the recording disk, the apparatus comprising:
a light emitting device that emits the light beam onto the recording track and the recording area;
a light beam detecting device that detects the light beam reflected from the recording track and the recording area, and generates detection signals;
a sampling device that samples each of the generated detection signals;
a level adjustment signal generating device that determines the type of the sampled detection signal based on the place from which the detected light beam is reflected, generates a level adjustment signal based on the middle level corresponding to the determined signal type, and subtracts the level adjustment signal from the sampled detection signal to produce a compensated detection signal; and
a decoding device that decodes the compensated detection signal to reproduce the information,
wherein said level adjustment signal generating device comprises:
a middle level detection circuit that detects a minimum middle level signal when the polarity of a sampling value included in the compensated detection signal with respect to the middle level reverses between adjacent sampling values, and outputs the detected signal as a middle level sampling signal;
an average calculating circuit for calculating averages of the middle level sampling signals supplied thereto from the middle level detection circuit and outputting average middle level signal;
shift signal generating circuitry that generates a middle level shift signal based on the middle level corresponding to the determined signal type; and
an adding device that adds the generated middle level shift signal to the average middle level signals.

5. The apparatus according to claim 4 wherein said average calculating circuit comprises:
a delay loop;
an adder having a first input supplied with the middle level sampling signal, and a second input; and
a multiplier supplied with an output of the adder, wherein the delay loop delays an output of the adder and supplies the delayed output to the second input of the adder.

6. The apparatus according to claim 4 further comprising:
a clock signal generation device that generates a clock signal, and that supplies the clock signal to the sampling device and the level adjustment signal generating device in order to synchronize operations of these devices with a frequency of the clock signal, wherein the frequency of the clock signal generated by the clock signal generating device changes in accordance with a reproduction speed of the information.

7. An information reproducing apparatus comprising:
a signal reader for reading signals from a recording medium, wherein the signals read from the recording medium include signals of different types each of which has a different middle level;
an A/D converter for sampling the signals of different types read from the recording medium;
a decoding circuit for reproducing information corresponding to the sampled signals; and
middle level adjustment circuitry for adjusting the middle levels of the signals output by the A/D converter so that the middle levels of the sampled signals of different types are uniform, the middle level adjustment circuitry comprising level adjustment signal generating circuitry for generating level adjustment signals having levels that change in accordance with the signal type of the sampled signals, and signal combining circuitry for combining the level adjustment signals with the sampled signals output by the A/D converter and outputting the level-adjusted sampled signals to the decoding circuit,
wherein the level adjustment signal generating circuitry comprises:
a middle level detection circuit supplied with level-adjusted sampled signals for generating middle level sampling signals in response thereto;
an average calculating circuit for calculating averages of the middle level sampling signals supplied thereto from the middle level detection circuit, and outputting average middle level signals;
a shift signal generating circuit for generating respective shift signals for shifting the middle levels of a corresponding signal type to a common middle level;
a selecting circuit for selecting the shift signals in accordance with the signal type of the signals read from the recording medium, and outputting the selected shift signals; and
a first signal combining circuit for combining the selected shift signals output by the selecting circuit and the average middle level signals output by the average calculating circuit, and outputting the combined signals as the level adjustment signals.

8. The information reproducing apparatus according to claim 7, wherein the signal combining circuitry comprises a second signal combining circuit for combining the level adjustment signals and the sampled signals output by the A/D converter.

9. The information reproducing apparatus according to claim 8, wherein the first signal combining circuit comprises an addition circuit and the second signal combining circuit comprises a subtraction circuit.

10. The information reproducing apparatus according to claim 7, wherein the signal reader comprises a signal reader for reading signals from a DVD-RAM.

11. The information reproducing apparatus according to claim 10, wherein the signal reader comprises a signal reader for reading signals recorded on the DVD-RAM using a single spiral-land/groove recording method.

12. The information reproducing apparatus according to claim 7, wherein the signals of different types include information signals read from land/grooves of the recording medium and control signals read from control signal areas of the recording medium.

* * * * *